United States Patent [19]

Ogawa et al.

[11] Patent Number: 5,261,370
[45] Date of Patent: Nov. 16, 1993

[54] CONTROL SYSTEM FOR INTERNAL COMBUSTION ENGINES

[75] Inventors: Ken Ogawa; Kei Machida, both of Wako, Japan

[73] Assignee: Honda Giken Kogyo Kabushiki Kaisha, Tokyo, Japan

[21] Appl. No.: 261

[22] Filed: Jan. 4, 1993

[30] Foreign Application Priority Data

Jan. 9, 1992 [JP] Japan .................. 4-020548
Jan. 9, 1992 [JP] Japan .................. 4-020549

[51] Int. Cl.$^5$ .............. F02D 41/08; F02M 25/07
[52] U.S. Cl. .................... 123/339; 123/492; 123/571
[58] Field of Search ........... 123/339, 478, 480, 486, 123/492, 493, 571

[56] References Cited

U.S. PATENT DOCUMENTS

| | | | |
|---|---|---|---|
| 4,388,906 | 6/1983 | Sugiyama et al. | 123/492 |
| 4,454,847 | 6/1984 | Isomura et al. | 123/492 |
| 4,665,883 | 5/1987 | Amano et al. | 123/571 |
| 4,667,640 | 5/1987 | Sekozawa et al. | 123/492 |
| 4,782,810 | 11/1988 | Shimoda et al. | 123/571 |
| 4,852,538 | 8/1989 | Nagaishi | 123/492 |
| 4,903,668 | 2/1990 | Ohata | 123/480 X |
| 4,919,094 | 4/1990 | Manaka et al. | 123/493 X |
| 4,995,366 | 2/1991 | Manaka et al. | 123/492 |
| 5,134,981 | 8/1992 | Takahashi et al. | 123/492 X |
| 5,134,983 | 8/1992 | Kusunoki et al. | 123/492 |

FOREIGN PATENT DOCUMENTS 61-126337 6/1986 Japan .
1-203641 8/1989 Japan .
0250285 11/1990 Japan .

*Primary Examiner*—Willis R. Wolfe
*Attorney, Agent, or Firm*—Lyon & Lyon

[57] ABSTRACT

A control system for an internal combustion engine corrects an amount of supply fuel to the engine based upon operating conditions of the engine as well as an estimated amount of adherent fuel adhering to the inner surface of the intake passage and an estimated amount of fuel carried off fuel adhering to the intake passage inner surface and carried into combustion chambers. The correction of the supply fuel amount is limited when the engine is operating in an idling condition. According to a further aspect of the invention, the adherent fuel amount and the carried-off fuel amount are corrected based upon a calculated amount of exhaust gases and a detected operating mode or valve timing of at least one of intake valves and exhaust valves.

13 Claims, 16 Drawing Sheets

CONTROL SYSTEM FOR INTERNAL COMBUSTION ENGINES

BACKGROUND OF THE INVENTION

1. Field of the Invention

This invention relates to a control system for internal combustion engines, and more particularly to a control system which controls the supply of fuel injected into an intake pipe in a manner compensating for a fuel amount adhering to the inner surface of the intake pipe.

2. Prior Art

In conventional internal combustion engines of the type that fuel is injected into an intake pipe, there is a problem that some of injected fuel adheres to the inner surface of the intake pipe, so that a required amount of fuel cannot be drawn into the combustion chamber resulting in a difficulty of accurately controlling the air-fuel ratio of a mixture supplied to the engine. To solve this problem, there has been proposed a fuel supply control method which estimates a fuel amount which is to adhere to the inner surface of the intake pipe and one which is to be drawn into the combustion chamber by evaporation from the fuel adhering to the intake pipe, and determines a fuel injection amount in dependence on the estimated fuel amounts (Japanese Provisional Patent Publication (Kokai) No. 61-126337).

To improve this fuel supply control method, a supply fuel amount correction method has been proposed by the assignee of the present application, which calculates a fuel amount adhering to the inner surface of the intake pipe by the use of coefficients Ae and Be which are obtained by correcting a direct supply ratio (the ratio of a fuel amount injected into the intake pipe and directly drawn into the combustion chamber to the whole amount of fuel injected into the intake pipe) and a carry-off ratio (the ratio of a fuel amount carried off the inner surface of the intake pipe and drawn into the combustion chambers to the amount of fuel adhering to the inner surface), in dependence on the rotational speed of the engine, etc., the two ratios being determined based upon the temperature of engine coolant and pressure within the intake pipe, and corrects the fuel amount to be supplied to the combustion chamber by the use of the amount of fuel adhering to the inner surface and the coefficients Ae, Be (Japanese Patent Application No. 3-283694, and corresponding U.S. Ser. No. 07/945,489 filed Sep. 16, 1992, still pending) (Prior Art A).

Further, in internal combustion engines equipped with exhaust gas recirculation systems, it has been conventionally known to correct the supply fuel amount during operation of the exhaust gas recirculation system. Usually, an exhaust gas recirculation system has a recirculation control valve arranged across an exhaust gas recirculation passage. The control valve has a response time lag in being actuated by a control signal. In view of this response time lag, a control system of this kind has been proposed, which delays the timing of starting or terminating the correction of the supply fuel amount by a time period depending upon operating conditions of the engine, from the time the recirculation control valve is changed over from a closed position thereof to an open position or vice versa (Japanese Provisional Patent Publication (Kokai) No. 1-203641)(Prior Art B).

Also, an internal Combustion engine has been known, which is equipped with a valve timing device which changes valve operating characteristics of intake valves and exhaust valves of the engine, i.e., the opening/closing timing (valve timing) and lift thereof during operation of the engine (e.g. Japanese Patent Publication (Kokoku) No. 2-50285)(Prior Art C].

However, Prior Art A has a problem that when the engine is idling, the pressure within the intake pipe varies due to variations or fluctuations in the intake air amount, and as a result, the values of the coefficients Ae, Be for correcting the supply fuel amount vary so that the actual fuel amount supplied to the engine fluctuates, resulting in the idling condition being unstable. Particularly, in an internal combustion engine provided with an auxiliary air amount control valve for controlling the idling speed of the engine, the auxiliary air amount control valve is much inferior in dynamic characteristics such as a response time lag to fuel being supplied to the engine and accordingly, during idling, the control valve cannot quickly respond to a change in the supply fuel amount, resulting in hunting of the rotational speed of the engine and unstable engine idling.

Further, Prior Art B does not contemplate the influence of fuel adhering to the inner surface of the intake pipe upon the correction of the fuel supply amount, while Prior Art A does not contemplate the influence of the exhaust gases recirculated to the intake pipe upon the determination of the fuel injection amount. Therefore, a mere combination of the two methods cannot accurately control the air, fuel ratio of a mixture supplied to the combustion chamber to a desired value. More specifically, the control system of Prior Art B corrects the fuel supply amount merely based upon whether or not the exhaust gas recirculation is being carried out, but it does not take into consideration a delay in recirculation of exhaust gases when the recirculation control valve is changed over from a closed position thereof to an open position thereof or vice versa, that is, dynamic characteristics of the recirculation control valve and dynamic characteristics of exhaust gases being recirculated, and hence is unable to correct the fuel supply amount to a value actually required by the engine. Therefore, even by merely combining together the fuel amount correction method dependent upon the adherent fuel amount and the fuel amount correction method dependent upon the operation of the recirculation control valve, it is impossible to accurately control the amount of fuel supplied to the engine so as to attain a desired air-fuel ratio.

On the other hand, in an internal combustion engine capable of changing the operating characteristics (operating mode) of intake valves, etc., as in Prior Art C, the fuel supply amount actually required by the engine varies depending upon the valve timing etc. Therefore, to accurately control the air-fuel ratio to a desired value by correcting the fuel supply amount depending upon both the adherent fuel amount and the exhaust gas recirculation amount, the fuel correction amount has to be determined by taking into account operating modes of the intake valves and/or the exhaust valves such as valve timing thereof.

SUMMARY OF THE INVENTION

It is a first object of the invention to provide a control system for an internal combustion engine, which is capable of accurately controlling the air-fuel ratio of a mixture supplied to combustion chambers of the engine, while ensuring stable idling condition of the engine.

It is a second object of the invention to provide a control system for an internal combustion engine equipped with an exhaust gas recirculation system and a device for changing operating characteristics of intake valves and/or exhaust valves of the engine, which is capable of properly controlling the air-fuel ratio of a mixture supplied to the combustion chambers by taking into consideration the influence of the exhaust gas recirculation and the operating characteristics of the intake vales and/or the exhaust valves, to thereby improve exhaust emission characteristics and drivability of the engine.

To attain the first object, according to a first aspect of the present invention, there is provided a control system for an internal combustion engine having at least one combustion chamber, and an intake passage having an inner surface, comprising operating condition detecting means for detecting operating conditions of the engine, supply fuel amount determining means responsive to operating conditions of the engine detected by the operating condition detecting means, for determining an amount of fuel to be supplied to the engine, adherent fuel amount estimating means for estimating an amount of fuel adhering to the inner surface of the intake passage, carried-off fuel amount estimating means for estimating an amount of fuel carried off fuel adhering to the inner surface of the intake passage and carried into the combustion chamber, supply fuel amount correction means for correcting the supply fuel amount determined by the supply fuel amount determining means, based upon operating conditions of the engine detected by the operating condition detecting means, and the adherent fuel amount estimated by the adherent fuel amount estimating means and the carried-off fuel amount estimated by the carried-off fuel amount estimating means, and fuel supply means for supplying the supply fuel amount corrected by the supply fuel amount correcting means into the intake passage.

The control system according to the first aspect of the invention is characterized by an improvement comprising correction limiting means for limiting the correction of the supply fuel amount based upon the estimated adherent amount and the estimated carried-off fuel amount by the supply fuel amount correcting means, when the operating condition detecting means detects that the engine is operating in an idling condition.

The adherent fuel amount estimating means and the carried-off fuel amount estimating means estimate the adherent fuel amount and the carried-off fuel amount, respectively, based upon operating parameters of the engine including pressure within the intake passage.

Preferably, the correction limiting means inhibits the correction of the supply fuel amount based upon the estimated adherent amount and the estimated carried-off fuel amount by the supply fuel amount correcting means.

Alternatively, the correction limiting means causes the adherent fuel amount estimating means and the carried-off fuel amount estimating means to estimate the adherent fuel amount and the carried-off fuel amount, respectively, based solely upon a temperature of the engine.

Preferably, the temperature of the engine is the temperature of engine coolant.

Also preferably, the adherent fuel amount estimating means continues the estimation of the adherent fuel amount even when the engine is detected to be operating in the idling condition.

To attain the second object, according to a second aspect of the invention, there is provided a control system for an internal combustion engine having an intake passage having an inner surface, at least one intake valve, at least one exhaust valve, an exhaust passage, at least one combustion chamber, exhaust gas recirculation means having an exhaust gas recirculation passage connecting between the exhaust passage and the intake passage, and an exhaust gas recirculation control valve for controlling recirculation of exhaust gases from the exhaust passage to the intake passage through the exhaust gas recirculation passage, and valve operating means for operating the intake valve and the exhaust valve, the valve operating means being capable of changing an operating mode of at least one of the intake valve and the exhaust valve, the control system including operating condition detecting means for detecting operating conditions of the engine, supply fuel amount calculating means for calculating an amount of supply fuel to be supplied to the engine, based upon operating conditions of the engine detected by the operating condition detecting means, adherent fuel amount estimating means for estimating an amount of adherent fuel adhering to the inner surface of the intake passage, carried-off fuel amount estimating means for estimating an amount of fuel carried off fuel adhering to the inner surface of the intake passage and carried into the combustion chamber, supply fuel amount correction means for correcting the supply fuel amount calculated by the supply fuel amount calculating means, based upon the adherent fuel amount estimated by the adherent fuel amount estimating means and the carried-off fuel amount estimated by the carried-off fuel amount estimating means, fuel supply means for supplying the supply fuel amount corrected by the supply fuel amount correcting means into the intake passage, and recirculation gas amount control means for controlling an amount of the exhaust gases to be recirculated from the exhaust passage to the intake passage, by controlling the exhaust gas recirculation control valve, based upon operating conditions of the engine detected by the operating condition detecting means.

The control system according to the second aspect of the invention is characterized by an improvement comprising:

recirculation gas amount calculating means for calculating the amount of the exhaust gases to be recirculated;

valve operating mode detecting means for detecting the operating mode of the at least one of the intake valve and the exhaust valve changed by the valve operating means; and estimated fuel amount correcting means for correcting the adherent fuel amount and the carried-off fuel amount, based upon the amount of the exhaust gases calculated by the recirculation gas amount calculating means and the operating mode of the at least one of the intake valve and the exhaust valve detected by the valve operating mode detecting means.

Preferably, the recirculation gas amount calculating means calculates the amount of the exhaust gases to be recirculated, based upon dynamic characteristics of the exhaust gas recirculation control valve and those of exhaust gases being recirculated, and the rotational speed and load condition of the engine.

Also preferably, the operating mode of the at least one of the intake valve and the exhaust valve is at least one of opening/closing timing and lift of the at least one of the intake valve and the exhaust valve.

The dynamic characteristics of the exhaust gas recirculation control valve include a response time lag of the valve in opening/closing action thereof.

The dynamic characteristics of the exhaust gases being recirculated include a time period between the time the exhaust gases being recirculated pass the exhaust gas recirculation control valve and the time the gases reach the combustion chamber, and an amount of exhaust gases staying in a passageway including the exhaust gas recirculation passage and the intake passage at a zone between the exhaust gas recirculation control valve and the combustion chamber.

The above and other objects, features, and advantages of the invention will be more apparent from the following detailed description taken in conjunction with the accompanying drawings.

DETAILED DESCRIPTION

The invention will now be described in detail with reference to the drawings showing embodiments thereof.

Figure 1:
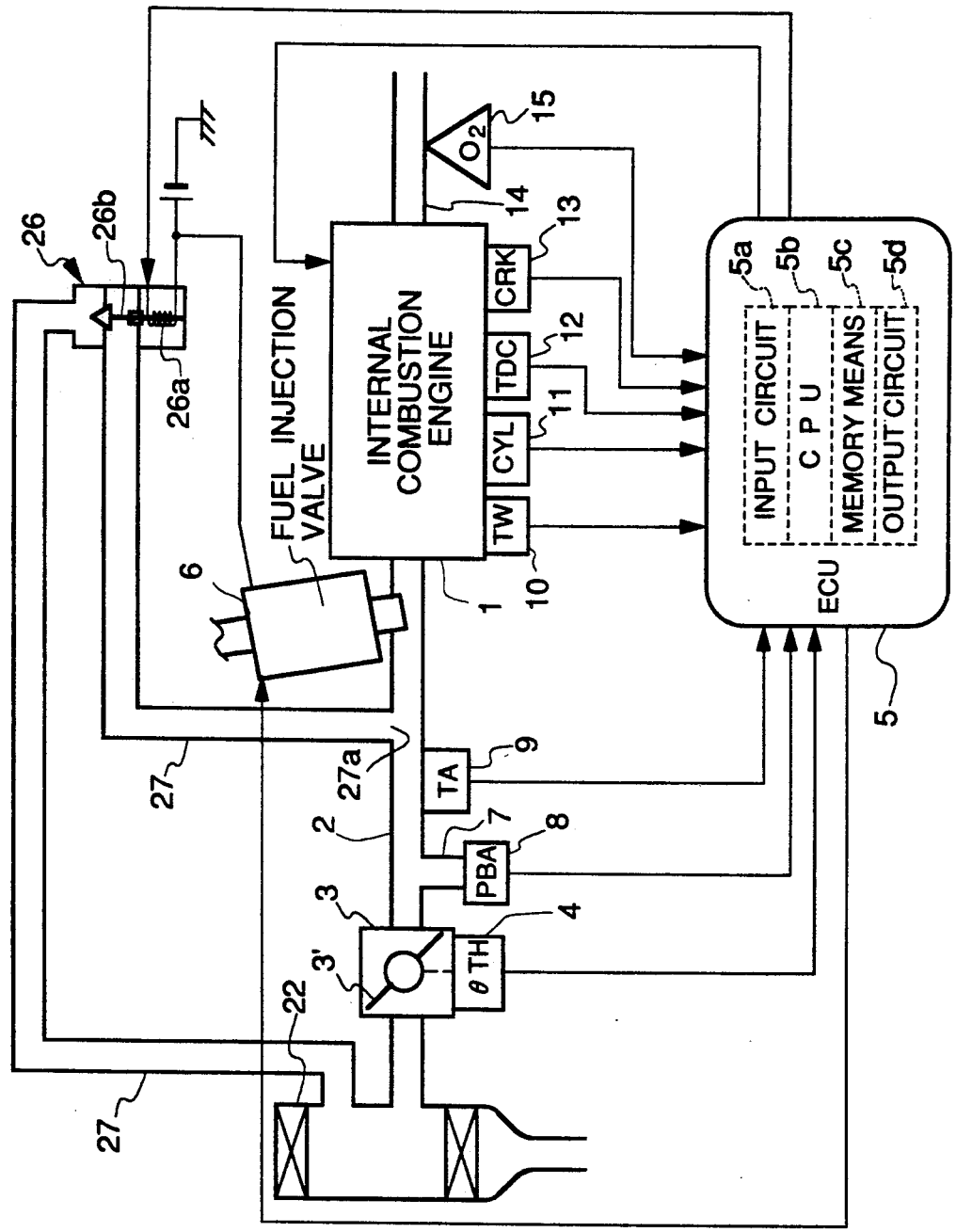
FIG. 1 is a block diagram showing the whole arrangement for an internal combustion engine and a control system therefor, according to a first embodiment of the invention.

Referring first to FIG. 1, there is illustrated the whole arrangement of an internal combustion engine, and a control system therefor, according to a first embodiment of the invention. In the figure, reference numeral 1 designates an internal combustion engine for automotive vehicles. The engine is a four-cylinder type, for instance. Connected to the cylinder block of the engine 1 is an intake pipe 2 across which is arranged a throttle body 3 accommodating a throttle valve 3' therein. A throttle valve opening ($\theta_{TH}$) sensor 4 is connected to the throttle valve 3' for generating an electric signal indicative of the sensed throttle valve opening and supplying same to an electronic control unit (hereinafter called "the ECU") 5.

An auxiliary air passage 27 opens at one end thereof into the intake pipe 2 at a location downstream of the throttle valve 3' and communicates with the atmosphere at the other end thereof through an air cleaner 22. Arranged across the auxiliary air passage 27 is an auxiliary air amount control valve (hereinafter merely referred to as "the AIC control valve") 26, which controls the idling rotational speed of the engine 1 in response to a control signal from the ECU 5 and has its valve opening (the opening area of the passage 27) controlled by the above control signal. In the illustrated embodiment, the AIC control valve 26 is formed by a linear solenoid valve which is comprised of a solenoid 26a connected to the ECU 5, and a valve element 26b displaceable in response to energization of the solenoid 26a to vary the opening area of the auxiliary air passage 27 by an amount proportional to an amount of current applied to the solenoid 26a.

Fuel injection valves 6, only one of which is shown, are inserted into the interior of the intake pipe 2 at locations intermediate between the cylinder block of the engine 1 and the throttle valve 3' and slightly upstream of respective intake valves, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 8 is provided in communication with the interior of the intake pipe 2 via a conduit 7 at a location immediately downstream of the throttle valve 3' for supplying an electric signal indicative of the sensed absolute pressure PBA within the intake pipe 2 to the ECU 5.

An intake air temperature (TA) sensor 9 is inserted into a wall portion of the intake pipe 2 downstream of the conduit 7, for supplying an electric signal indicative of the sensed intake air temperature TA to the ECU 5.

An engine coolant temperature (TW) sensor 10, which is formed of a thermistor or the like, is mounted in the cylinder block of the engine 1, for supplying an electric signal indicative of the sensed engine coolant temperature TW to the ECU 5. A cylinder-discriminating (CYL) sensor 11, a TDC sensor 12, and a crank angle (CRK) sensor 13 are arranged in facing relation to a camshaft or a crankshaft of the engine 1, not shown. The cylinder-discriminating (SAIL) sensor 11 generates a pulse at a predetermined crank angle of a particular cylinder of the engine, and the TDC sensor 12 generates a pulse as a TDC signal pulse at each of predetermined crank angles whenever the crankshaft rotates through 180 degrees, both the pulses being supplies to the ECU 5. The CRK sensor 13 generates a pulse as a CRK signal pulse at each of predetermined crank angles whenever the crankshaft rotates through a predetermined angle (e.g. 45 degrees) much smaller than 180 degrees, and supplies the CRK signal pulse to the ECU 5.

Output signal pulses from the SAIL sensor 11, the TDC sensor 12, and the CRK sensor 13 are used for controlling the timing of execution of fuel injection timing, ignition timing, etc. and for detecting the engine rotational speed NE.

An oxygen concentration sensor (hereinafter referred to as "the $O_2$ sensor") 15 is arranged in an exhaust pipe 14 of the engine 1, for sensing the concentration of oxygen contained in the exhaust gases from the engine 1 and supplying an electric signal indicative of the sensed oxygen concentration to the ECU 5.

The ECU 5 comprises an input circuit 5a having the functions of shaping the waveforms of input signals from various sensors, shifting the voltage levels of sensor output signals to a predetermined level, converting analog signals from analog-output sensors to digital signals, and so forth, a central processing unit (hereinafter referred to as "the CPU") 5b, memory means 5c having a ROM storing various operational programs which are executed in the CPU 5b, various maps and tables, etc., and a RAM for storing results of calculations therefrom, etc., and an output circuit 5d which outputs driving signals to the fuel injection valves 6, the AIC control valve 26, etc.

Figure 2:
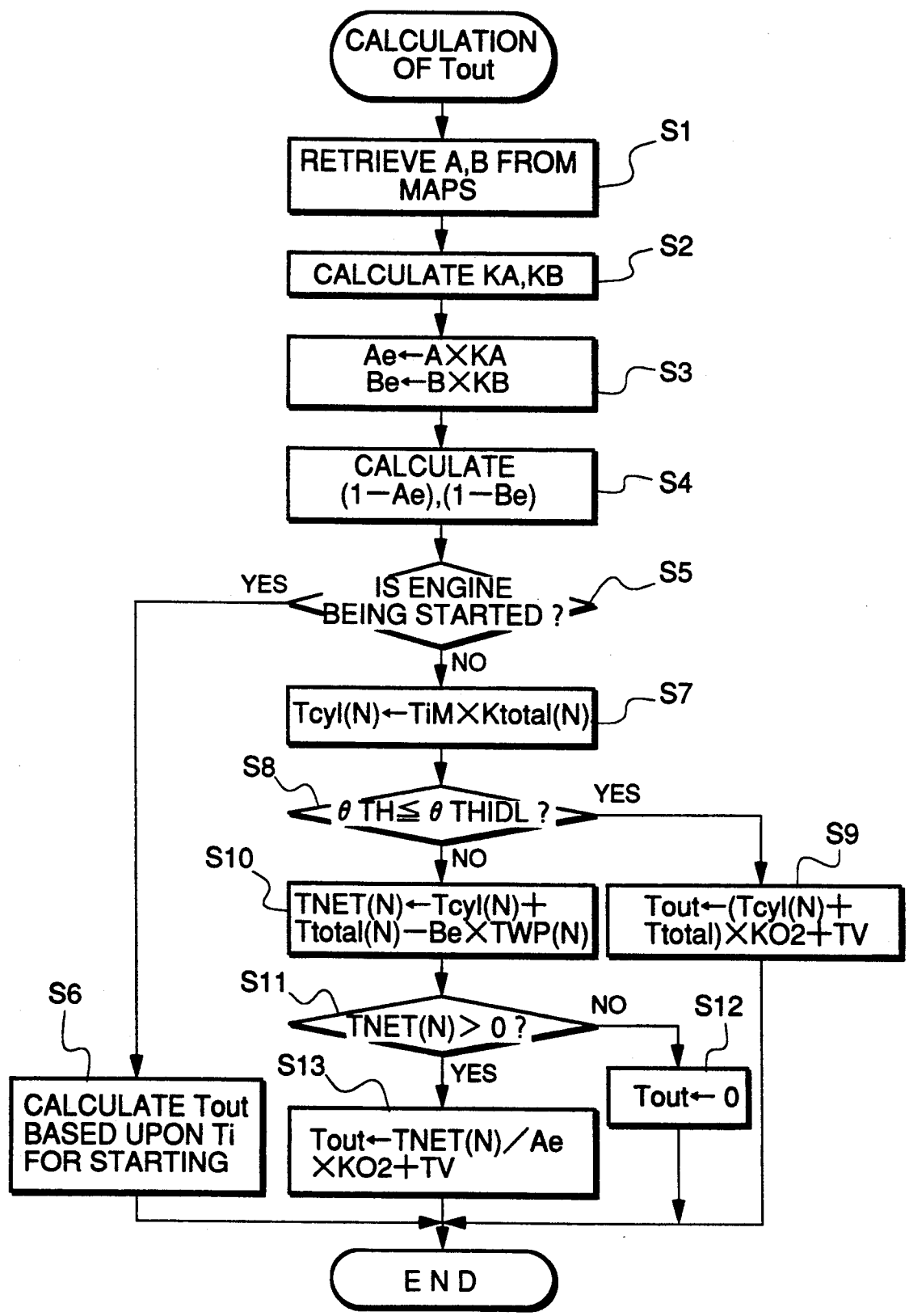
FIG. 2 is a flowchart of a program for calculating a fuel injection period (Tout)

FIG. 2 shows a program for calculating a valve opening period of the fuel injection valves 6, i.e., a fuel injection amount Tout. This program is executed upon generation of each TDC signal pulse and in synchronism therewith.

At a step S1, a direct supply ratio A and a carry-off ratio B are calculated. The direct supply ratio A is defined as a ratio of a fuel amount injected into the intake pipe 2 and directly or immediately drawn into a combustion chamber to the whole fuel amount injected in a cycle, the direct supply ratio including a fuel amount carried off the inner surface of the intake pipe 2 by evaporation etc. and drawn into the combustion chamber, in the same cycle. The carry-off ratio B is defined as a ratio of a fuel amount carried off the inner surface of the intake pipe and drawn into the combustion chamber in the present cycle to the whole fuel amount which adhered to the inner surface of the intake pipe 2 in the last or immediately preceding cycle. The direct supply ratio A and the carry-off ratio B are read, respectively, from an A map and a B map set in accordance with coolant temperature TW and intake pipe absolute pressure PBA, in response to the detected TW and PBA values. The direct supply ratio A and the carry-off ratio B may be calculated by interpolation, if required.

Figure 4:
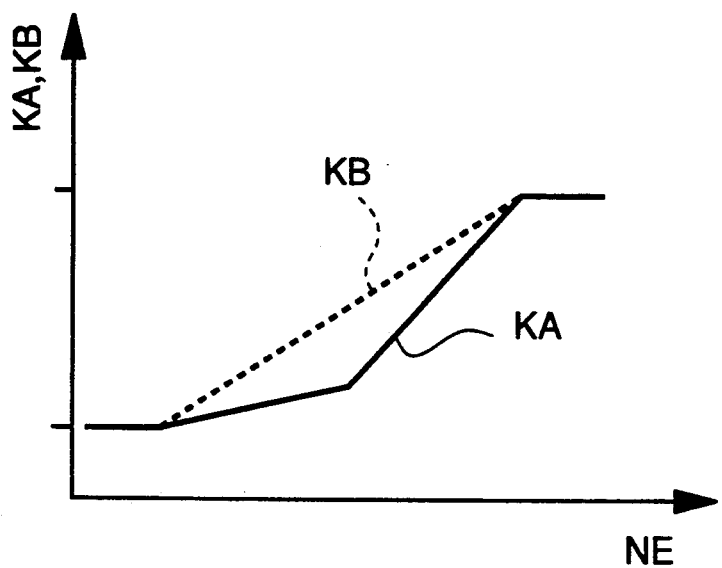
FIG. 4 shows tables for determining correction coefficients KA, KB for correcting a direct supply ratio A and a carry-off ratio B.

At the next step S2, correction coefficients KA and KB, which correct the direct supply ratio A and the carry-off ratio B, are calculated. The correction coefficients KA and KB are determined in response to the engine rotational speed NE, by tables shown in FIG. 4. The correction coefficients KA, KB are set such that they increase as the engine rotational speed Ne increases.

The reason why the correction coefficients KA and KB are thus increased as the engine rotational speed NE increases is that the direct supply ratio A and the carry-off ratio B apparently increase as the intake air flow speed in the intake pipe increases with an increase in the engine rotational speed NE.

Next, at a step S3, corrected values Ae and Be of the direct supply ratio and the carry-off ratio are calculated by the use of the following equations (1) and (2). Further, values (1−Ae) and (1−B) are calculated at a step S4, followed by the program proceeding to a step S5:

$$Ae = A \times KA \quad (1)$$

$$Be = B \times KB \quad (2)$$

The values Ae, (1−Ae) and (1−Be) thus calculated are stored into the RAM of the ECU 5 for use in executing a program shown in FIG. 3, which will be described hereinafter.

At a step S5, it is determined whether or not the engine is being started. If the answer is affirmative (YES), the fuel injection amount Tout is calculated based upon a basic fuel amount Ti for use at the start of the engine, and then the program is terminated. If the answer to the question of the step S5 is negative (NO), i.e., if the engine is not being started, a required fuel amount TCYL(N) for each cylinder, which does not include an additive correction term Ttotal, referred to hereinafter, is calculated by the use of the following equation (3), at a step S7:

$$Tcyl(N) = TiM \times Ktotal(N) \quad (3)$$

where (N) represents a number allotted to the cylinder for which the required fuel amount Tcyl is calculated. TiM represents a basic fuel amount to be applied when the engine is under normal operating conditions (i.e., operating conditions other than the starting condition) and is calculated in response to the rotational speed NE and the intake pipe absolute pressure PBA. Ktotal(N) represents the product of all correction coefficients (e.g. a coolant temperature-dependent correction coefficient KTW and a leaning correction coefficient KLS) which are calculated based upon engine operating parameter signals from various sensors excluding an air fuel ratio correction coefficient K02 which is calculated based on an output signal from the $O_2$ sensor 15.

At the following step S8, it is determined whether or not the throttle valve opening θTH is larger than a predetermined value θTHIDL, that is, whether the engine is idling. If the answer to this question is affirmative (YES), the fuel injection period Tout is calculated by the use of the following equation (4):

$$Tout = (Tcyl(N) + Ttotal) \times K02 + TV \quad (4)$$

where Ttotal represents the sum of all additive correction terms which are calculated in response to engine operating parameters from various sensors (e.g. a fuel increasing correction term TRUN applied immediately after the start of the engine), K02 an air-fuel ratio correction coefficient calculated in response to the output from the 02 sensor 15, and TV an ineffective time correction term dependent upon an output voltage from a battery.

Figure 3:
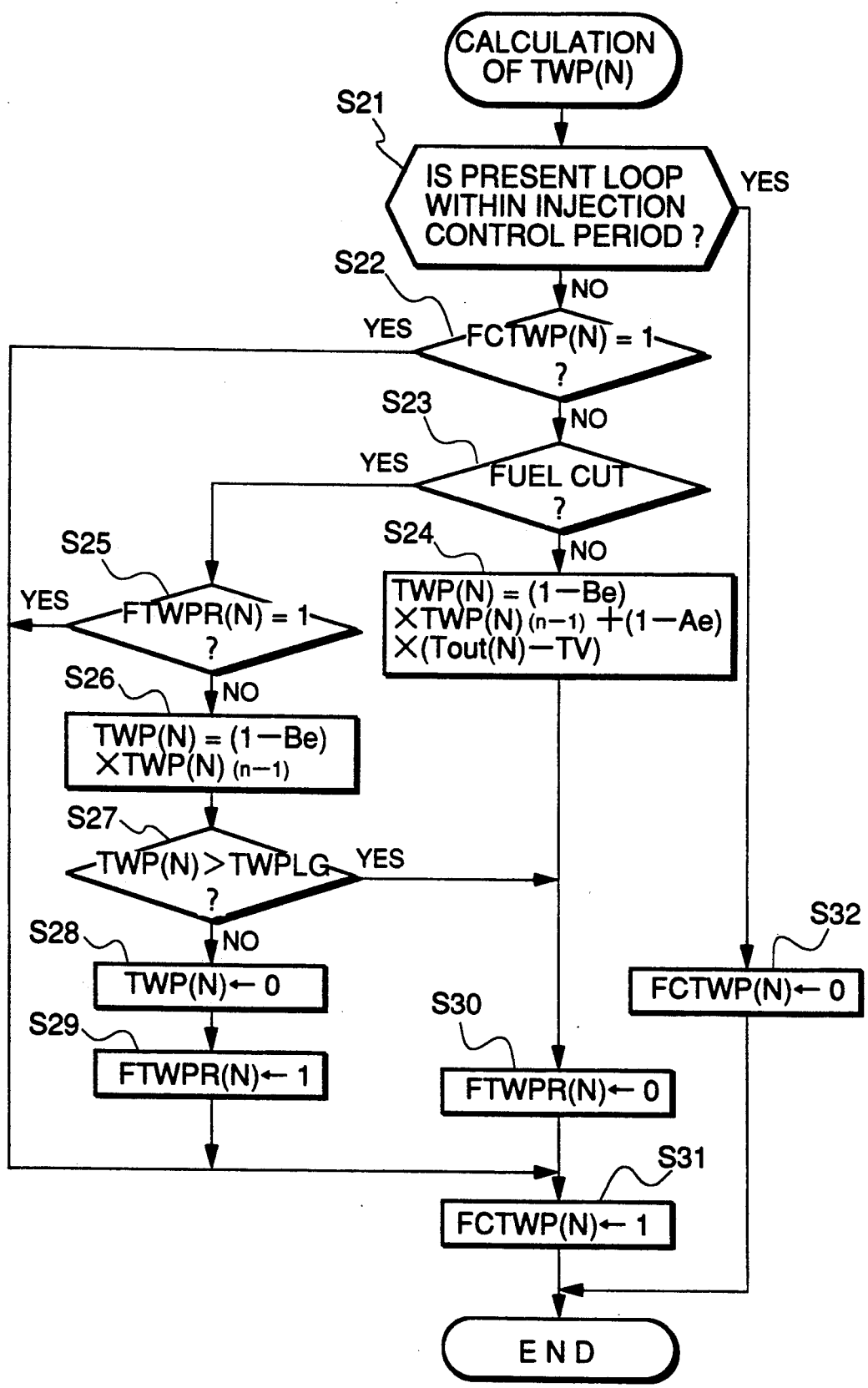
FIG. 3 is a flowchart of a program for calculating an amount of fuel adhering to the inner surface of the intake pipe (TWP(N))

If the answer to the question of the step S8 is negative (NO), i.e. if the engine is not idling, a fuel amount TNET to be supplied to the combustion chamber of the cylinder into which the fuel injection is to be made in the present loop, is calculated by the use of the following equation (5):

$$TNET = Tcyl(N) + Ttotal - Be \times TWP(N) \quad (5)$$

where TWP(N) represents an intake pipe-adherent fuel amount (estimated value), which is calculated by the program of FIG. 3. ($Be \times TWP(N)$) corresponds to an amount of fuel, which is evaporated from fuel adhering to the inner surface of the intake pipe 2 and carried into the combustion chamber. A fuel amount corresponding to the fuel amount carried off the intake pipe inner surface need not be injected, and therefore, is to be subtracted from the value Tcyl(N) in the equation (5).

At the next step S11, it is determined whether or not the value TNET calculated by the equation (5) is larger than a value of 0. If the answer is negative (NO), i.e., if TNET = <0, the fuel injection amount Tout is set to 0 at a step S12, followed by terminating the program. If the answer to the question of the step S11 is affirmayative (YES), i.e., if TNET>0, the Tout value is calculated by the use of the following equation (6):

$$Tout = TNET(N)/Ae \times KO2 + TV \quad (6)$$

where KO2 is the aforementioned air-fuel ratio correction coefficient calculated in response to the output from the $O_2$ sensor 15. TV is the ineffective time correction term.

Thus, a fuel amount corresponding to (TNET(N)−$\times$KO2+Be$\times$TWP(N)) is supplied to the combustion chamber by opening the fuel injection valve 6 over the time period Tout calculated by the equation (6).

FIG. 3 shows the program for calculating the intake pipe-adherent fuel amount TWP(N), which is executed upon generation of each CRK signal pulse which is generated whenever the crankshaft rotates through a predetermined angle (e.g. 45 degrees).

At a step S21, it is determined whether or not the present loop of execution of this program falls within a time period after the start of the calculation of the fuel injection amount Tout and before the fuel injection is completed (hereinafter referred to as the injection control period). If the answer is affirmative (YES), a first flag FCTWP(N) is set to a value of 0 at a step S32, followed by terminating program. If the answer at the step S21 is negative (NO), i.e., if the present loop is not within the injection control period, it is determined at a step S22 whether or not the first flag FCTWP(N) is equal to 1. If the answer is affirmative (YES), that is, if FCTWP(N) = 1, the program jumps to a step S31, whereas if the answer is negative (NO), i.e., if FCTWP(N) = 0, it is determined at a step S23 whether or not the engine is under fuel cut (interruption of the fuel supply).

If the engine is not under fuel cut, the intake pipe-adherent fuel amount TWP(N) is calculated at a step S24 by the use of the following equation (7), then a second flag FTWPR(N) is set to a value of 0, and the first flag FCTWP(N) is set to a value of 1 at steps S30 and S31, followed by terminating the program:

$$TWP(N) = (1-Be) \times TWP(N)(n-1) + (1-Ae) \times (Tout(N) - TV) \quad (7)$$

where TWP(N)(n−1) represents a value of TWP(N) obtained on the last occasion, and Tout(N) an updated or new value of the fuel injection amount Tout which has been calculated by the program of FIG. 2. The first term on the right side corresponds to a fuel amount remaining on the inner surface if the intake pipe 2 without being carried into the combustion chamber, out of the fuel previously adhering to the inner surface of the intake pipe 2, and the second term on the right side corresponds to a fuel amount newly adhering to the inner surface of the intake pipe 2 out of newly injected fuel.

If the answer at the step S23 is affirmative (YES), i.e., if the engine is under fuel cut, it is determined at a step S25 whether or not the second flag FTWPR(N) has been set to a value of 1. If the answer is affirmative (YES), i.e., if FTWPR(N) = 1, the program jumps to the step S31. If the answer is negative (NO), i.e., if FTWPR(N) = 0, the adherent fuel amount TWP(N) is calculated by the use of the following equation (8) at a step S26, and then the program proceeds to a step S27:

$$TWP(N) = (1-Be) \times TWP(N)(n-1) \quad (8)$$

The equation (8) is identical with the equation (7), except that the second term on the right side is omitted. The reason for the omission is that there is no fuel newly adhering to the intake pipe inner surface, due to fuel cut.

At the step 27, it is determined whether or not the calculated TWP(N) value is larger than a very small predetermined value TWPLG. If the answer is affirmative (YES), i.e., if TWP(N)>TWPLG, the program proceeds to the next step S30. If the answer is negative (NO), i.e., if TWP(N)<TWPLG, the TWP(N) value is set to a value of 0 at a step S28, and then the second flag FTWPR(N) is set to a value of 1 at a step S29, followed by the program proceeding to the step S31.

According to the program of FIG. 3 described above, the intake pipe-adherent fuel amount TWP(N) can be accurately calculated. Moreover, an appropriate fuel amount can be supplied to the combustion chamber of each cylinder, which reflects the fuel amount adhering to the inner surface of the intake pipe 2 as well as the fuel amount carried off the adherent amount.

Further, according to the present embodiment, when the engine is idling, the correction of the supply fuel amount dependent upon the adherent fuel amount and the carried-off fuel amount is inhibited, to thereby prevent variations in the supply fuel amount due to fluctuations in the intake pipe absolute pressure PBA and hence secure a stable idling condition of the engine.

Figure 5:
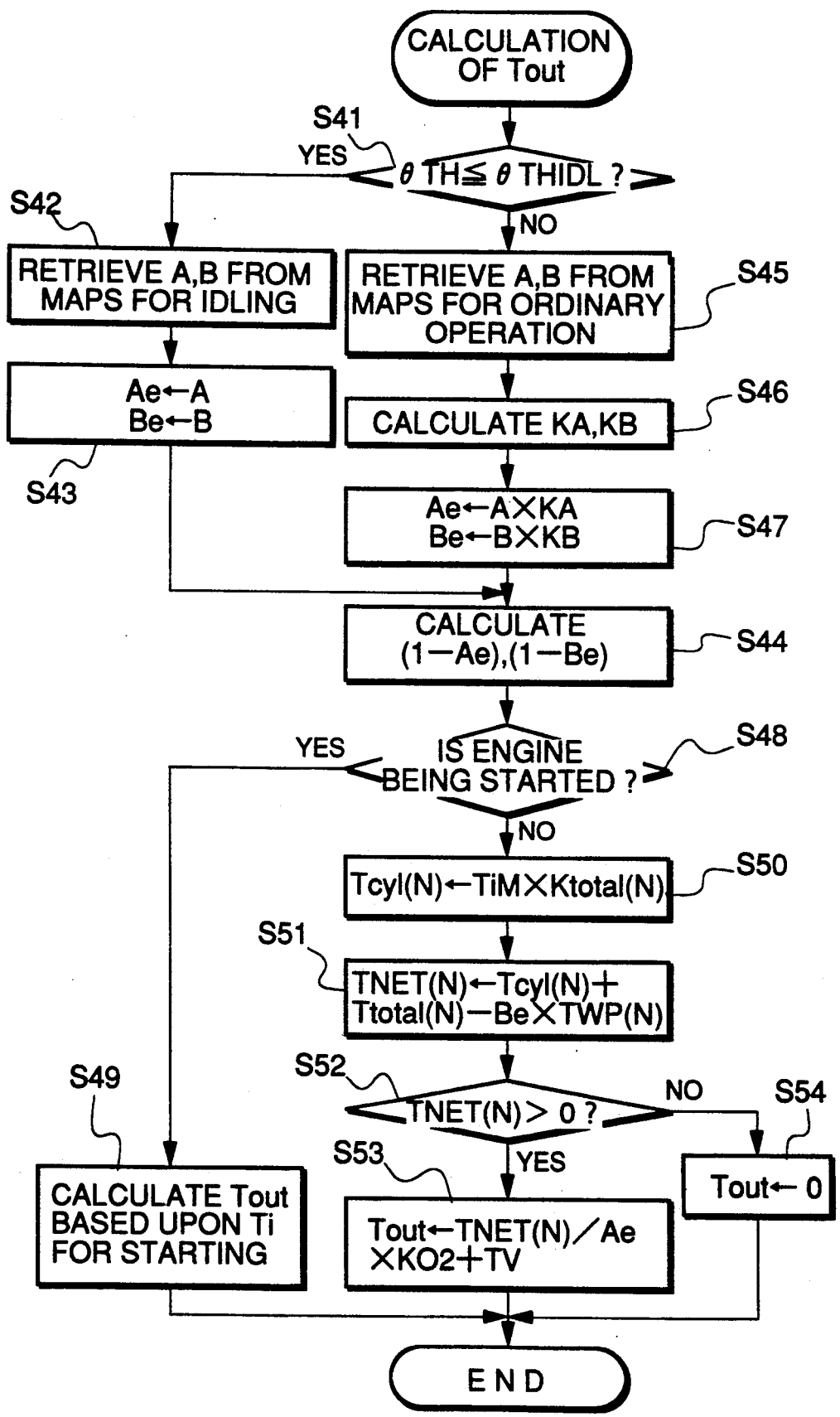
FIG. 5 is a flowchart of a program for calculating the fuel injection period Tout, which is executed by a second embodiment of the invention.

FIG. 5 shows a program for calculating the fuel injection amount Tout, according to a second embodiment of the invention. An internal combustion engine and a control system therefor, according to the second embodiment, can be substantially identical with those illustrated in FIG. 1, except that the ECU 5 has a role of idling coefficient setting means, in place of fuel amount correction-inhibiting means, and therefore description thereof is omitted.

Figure 6:
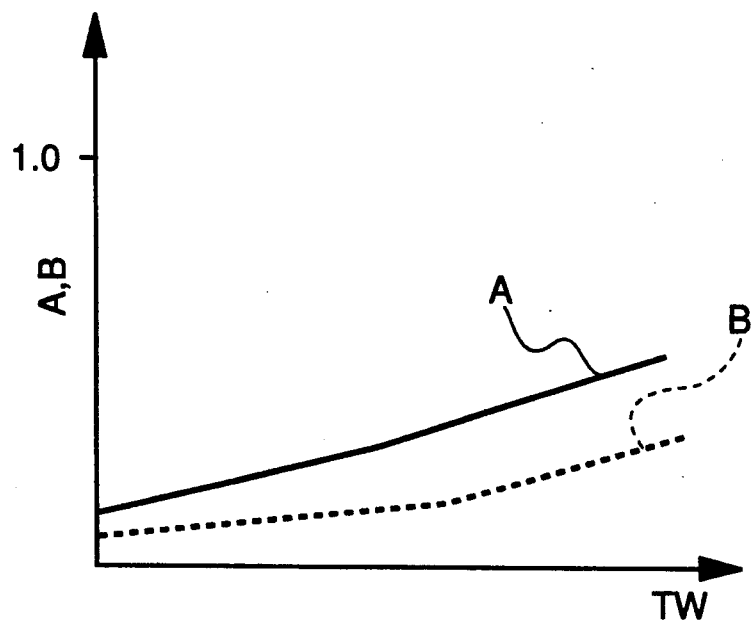
FIG. 6 shows tables for determining the direct supply ratio A and the carry-off ratio B, applicable during idling of the engine.

First, at a step S41 in FIG. 5, it is determined whether or not the throttle valve opening $\theta TH$ is larger than the predetermined value $\theta THIDL$, i.e., whether or not the engine is idling. If the answer to the question is affirmative (YES), a direct supply ratio A and a carry-off ratio B for use at idling are calculated by the use of A/B tables for idling, shown in FIG. 6. In the tables of FIG. 6, the direct supply ratio A and the carry-off ratio B are set according to the engine coolant temperature TW alone, such that as the engine coolant temperature TW is higher, the ratios A and B become greater. Since the direct supply ratio A and the carry-off ratio B for idling are read from the A/B tables for idling in accordance with the detected engine coolant temperature TW alone, the values thereof do not depend upon the detected intake pipe absolute pressure PBA.

At the following step S43, the A, B values calculated as above are directly adopted as a corrected direct supply ratio Ae and a corrected carry-off ratio B, followed by the program proceeding to a step S44.

If the answer to the question of the step S41 is negative (NO), i.e., if the engine is not idling, the program proceeds to steps S45 to S47, wherein calculations are made of the direct supply ratio A and the carry-off ratio B, the correction coefficients KA, KB, and the corrected direct supply ratio Ae and the corrected carry-off ratio Be, in the same manner as the steps S1 to S3 in FIG. 2.

At the next step S48, it is determined whether or not the engine is being started. If the engine is being started, the fuel injection amount Tout is calculated based upon a basic fuel amount Ti for the start of the engine, at a step S49, followed by terminating the program. If the answer to the question of the step S48 is negative (NO), i.e., if the engine is not being started, the required fuel amount Tcyl(N) to be supplied to the cylinder, exclusive of the additive correction term Ttotal is calculated by the use of the aforementioned equation (3), at a step S50. In the following steps S51 to S54, the fuel injection amount Tout is calculated in the same manner as the steps S10 to S13 in FIG. 2, followed by terminating the program. In addition, the intake pipe-adherent fuel amount TWP(N) is calculated by the program of FIG. 3, already described.

According to the present embodiment, the supply fuel amount TW is corrected by the use of the corrected direct supply ratio Ae and the corrected carry-off ratio Be which do not depend upon the intake pipe absolute pressure PBA but depend solely upon the engine coolant temperature TW. As a result, variations in the supply fuel amount can be prevented irrespective of fluctuations in the intake pipe absolute pressure PBA, thereby enabling to achieve a stable idling condition of the engine.

Next, a third embodiment of the invention will be described with reference to FIG. 7 to FIG. 16.

Figure 7:
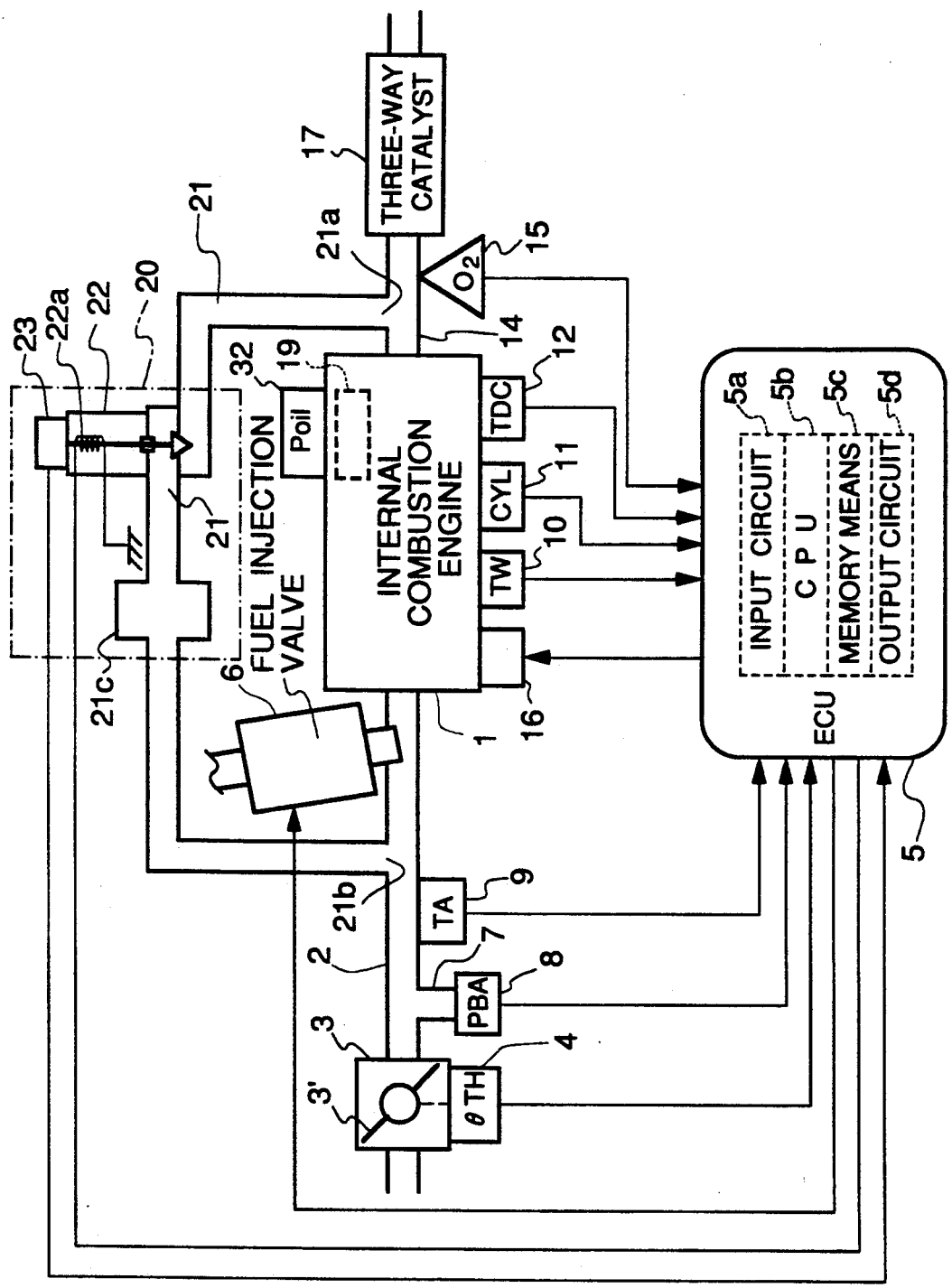
FIG. 7 is a block diagram showing the whole arrangement of an internal combustion engine and a control system therefor, according to a third embodiment of the invention.

FIG. 7 shows the whole arrangement of an internal combustion engine equipped with an an exhaust gas recirculation system, and a control system therefor, according to the third embodiment. In FIG. 7, elements and parts corresponding to those in FIG. 1 are designated by identical reference numerals.

In the figure, reference numeral 1 designates an internal combustion engine which is a four cylinder type and has a pair of intake valves and a pair of exhaust valves provided for each cylinder, none of which is shown. The engine 1 is provided with a valve timing changeover device 19 which is capable of changing the valve timing of the intake valves and the exhaust valves between a high-speed valve timing suitable for engine operation in a high-speed rotational speed region (hereinafter referred to as "the high-speed V/T"), and a low-speed valve timing suitable for engine operation in a low-speed rotational speed region (hereinafter referred to as "the low-speed V/T"). The term "valve timing" used in the present embodiment represents not only the opening/closing timing of the valves but also the lift of the valves.

A spark plug 16 of each cylinder of the engine 1 is electrically connected to the ECU 5 to have its spark ignition timing $\theta IG$ control by a signal therefrom.

The valve timing changeover device 19 includes an electromagnetic valve, not shown, for controlling changeover between the high-speed V/T and the low-speed V/T, which is also electrically connected to the ECU 5 to have its opening/closing action controlled by a signal therefrom. The electromagnetic valve changes oil pressure within the valve timing changeover device 19 between a high level and a low level, depending upon which the valve timing is changed over between the high-speed V/T and the low-speed V/T. The oil pressure within the valve timing changeover device 9 is detected by an oil pressure (Poil) sensor 32, which supplies an electric signal indicative of the sensed oil pressure to the ECU 5.

In FIG. 7, reference numeral 20 designates an exhaust gas recirculation system. An exhaust gas recirculation passage 21 is communicated at an end 21a thereof with the exhaust pipe 14 at a location upstream of a three-way catalyst 17, and at the other end 21b thereof with the intake pipe 2 at a location downstream of the throttle valve 3'. An exhaust gas recirculation valve (exhaust gas recirculation control valve) 22, which controls an amount of exhaust gases to be recirculated, and a bulk chamber 21C are arranged across the exhaust gas recirculation passage 21. The exhaust gas recirculation valve 22 is an electromagnetic valve having a solenoid 22a which is electrically connected to the ECU 5 such that the valve opening thereof is linearly changed in proportion to the current amount of a control signal from the ECU 5. A lift sensor 23 is connected to a valve element of the exhaust gas recirculation valve 22 for supplying a signal indicative of the sensed valve opening to the ECU 5.

The ECU 5 operates to determine operating conditions of the engine based upon engine operating parameters signals from the above-mentioned various sensors, etc. and supplies a control signal to the solenoid 22a of the exhaust gas recirculation valve 22 so as to make zero the difference between a valve opening command value LCMD for the exhaust gas recirculation valve 22 set in response to the intake passage absolute pressure PBA and the engine rotational speed NE and an actual valve opening value of the valve 22, which is detected by the lift sensor 23.

The other elements and parts than those described above are identical in arrangement and function with corresponding ones in FIG. 1, description of which is, therefore, omitted.

The CPU 5b of the ECU 5 operates in response to engine operating parameter signals from various sensors appearing in FIG. 7, etc., to determine operating conditions in which the engine 1 is operating, such as an air-fuel ratio feedback control region and open-loop control regions, and calculates, based upon the determined operating conditions, a fuel injection period Tout over which the fuel injection valves 6 are to be operated, and the ignition timing $\theta IG$ of the spark plugs 16.

Further, the CPU 5b controls the valve opening of the exhaust gas recirculation valve 22 of the above-mentioned exhaust gas recirculation system 20, and the valve opening of the electromagnetic valve of the valve timing changeover device 19, in response to operating conditions of the engine.

The CPU 5b operates based upon the results of the above calculations to supply signals for driving the fuel injection valves 6, the spark plugs 16, the electromagnetic valve of the valve timing device 19, and the exhaust gas recirculation valve 22 through the output circuit 5d.

Figure 8A:
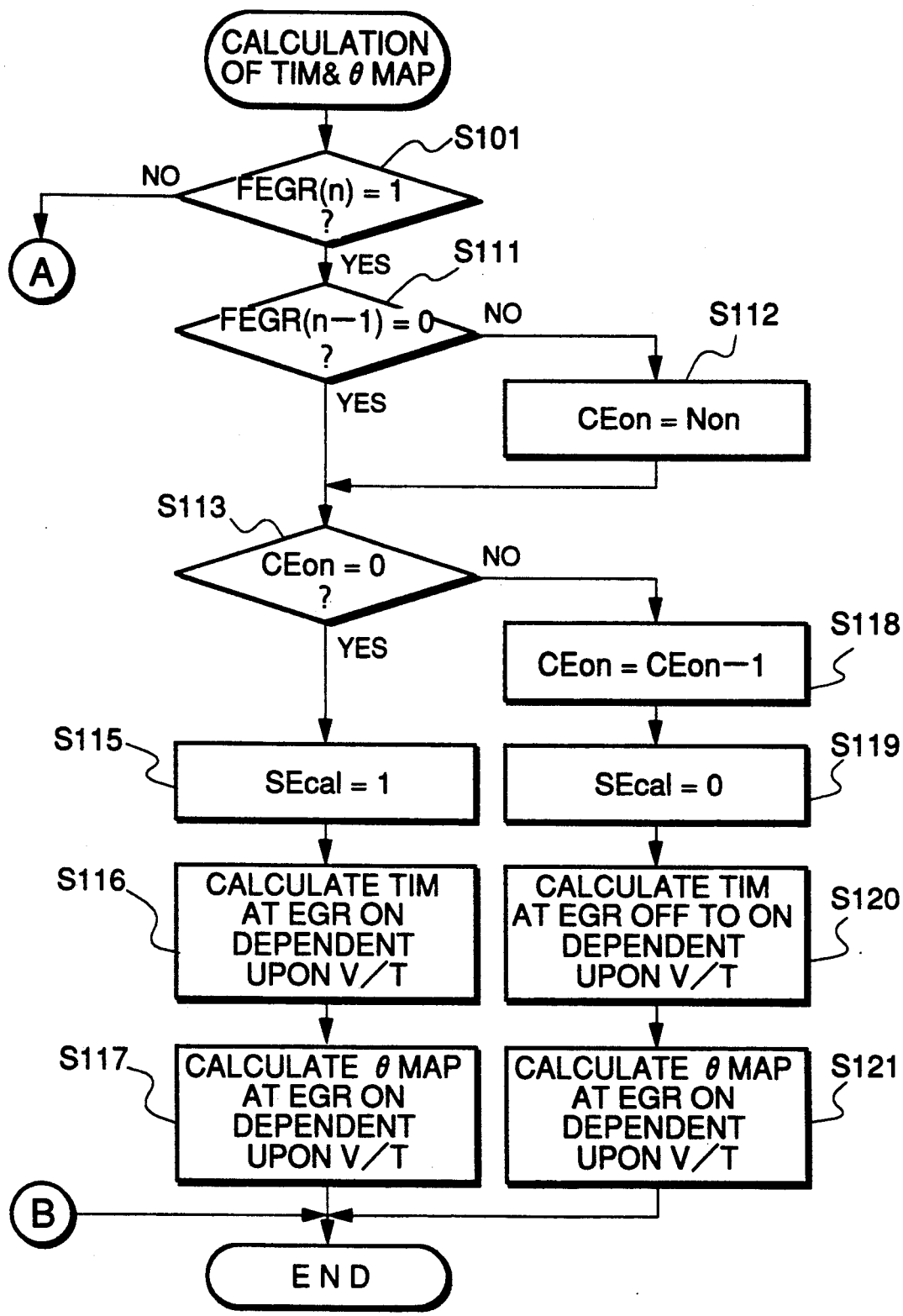
FIGS. 8a and 8b are flowcharts of a program for calculating a basic fuel amount TIM and a basic ignition timing $\theta$MAP in response to opening/closing of an exhaust gas recirculation valve.
Figure 8B:
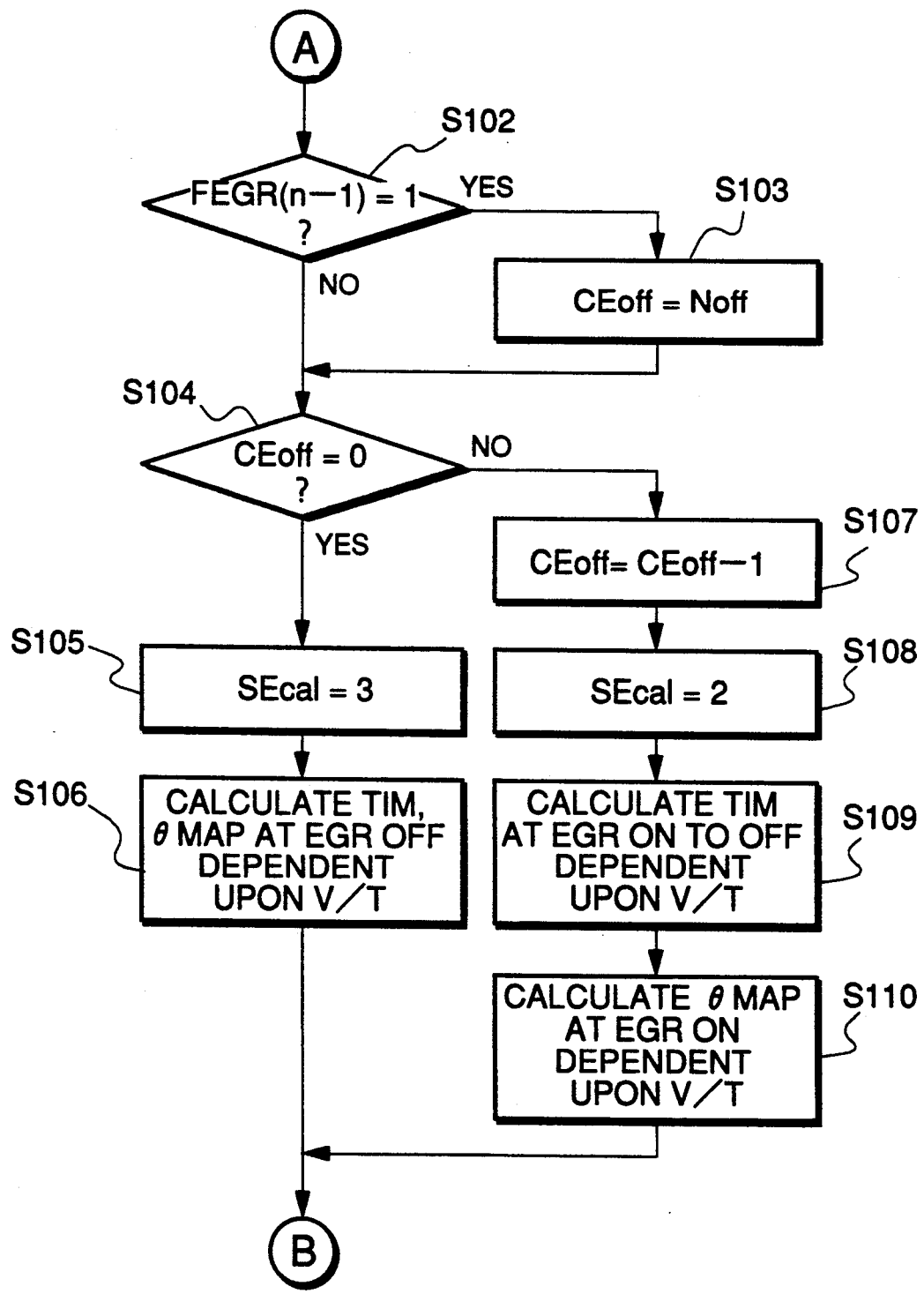

FIGS. 8a and 8b show a program for executing calculation of the basic fuel amount TIM and the basic ignition timing θMAP in response to opening and closing of the exhaust gas recirculation valve 22 (hereinafter referred to as "the EGR valve").

The basic fuel amount TIM and the basic fuel ignition timing θMAP are calculated in response to the engine rotational speed NE and the intake pipe absolute pressure value PBA, as mentioned before. Further, the calculation is made by the use of different maps selected depending upon whether the EGR valve is open or closed.

The program is executed upon generation of each TDC signal pulse and in synchronism therewith. In the following description, the state in which the EGR valve 22 is open will be referred to as "EGR on", while the state in which the EGR valve is closed "EGR off".

At a step S101 in FIG. 8a, it is determined whether or not a value of an EGR flag in the present loop IEGR(n), which flag is set to a value of 1 at EGR on, assumes the value of 1. Irrespective of the answer, it is determined at steps S102, S111 whether or not a value FEGR(n−1) of the EGR flag in the last loop assumes 1.

If the answer to the question of the step S101 is negative (NO) and at the same time the answer to the question of the step S102 is affirmative (YES), i.e., if FEGR(n)=0 and FEGR(n−1)=1, an off counter CEoff, which counts the number of times of execution of the present program (the number of TDC signal pulses generated) after the EGR valve is changed from an on state to an off state, is set to a predetermined value Noff (e.g. 12) at a step S103, and then the program proceeds to a step S104.

If both of the answers to the questions of the steps S101 and S102 are negative (NO), i.e., if FEGR(n)=FEGR(n−1)=0, the program jumps to the step S104, where it is determined whether or not the count value of the off counter CEoff is equal to 0. If the answer to the question of the step S104 is negative (NO), i.e., if CEoff>0, the count value of the off counter CEoff is decremented by 1 at a step S107, and then a mode status SEcal is set to a value of 2 at a step S108. The mode status SEcal is used at the next step S109 to discriminate the state of the EGR valve, i.e. an on state, an off state, a transient state where the EGR valve has been changed from the on state to the off state, or a transient state where the EGR valve has been changed from the off state to the on state.

The value of 2 means that the EGR valve is in the transient state where the EGR valve has been changed from the on state to the off state.

At the following steps S109, S110, the basic fuel amount TIM is calculated by programs in FIG. 9 and FIG. 10, described hereinafter, and the basic ignition timing θMAP by a program in FIG. 11, hereinafter described, followed by terminating the program.

If the answer to the question of the step S104 is affirmative (YES), i.e., if CEoff=0, which means that a predetermined number (Noff) of TDC signal pulses have been generated after the EGR valve was changed to the off state, and therefore it is considered that the EGR valve is stable in the off state. Then, the mode status SEcal is set to a value of 3, at the step S105. The value of 3 means that the EGR valve is in the off state.

Then, the TIM value and the θMAP value to be applied when the EGR valve is in the off state, i.e., the ordinary TIM and θMAP values are calculated, at a step S106, followed by terminating the program.

If the answer to the question of the step S101 is affirmative (YES) and at the same time the answer to the question of the step S111 is negative (NO), i.e., if FEGR(n)=1 and FEGR(n−1)=0, it is determined that the EGR valve is in the transient state where it has been changed from the off state to the on state, and then an on-counter CEon, which counts the number of times of execution of the program after the transition from the EGR off state to the EGR on state, is set to a mined value Non (e.g. 10), at a step S112, followed by the program proceeding to a step S113.

If both of the answers to the questions of the steps S101 and S111 are affirmative (YES), i.e. if FEGR(n)=FEGR(n−1)=1, the program directly proceeds to the step S113, where it is determined whether or not the on-counter CEon assumes 0. If the answer to the question of the step S113 is negative (NO), i.e. if CEon>0, the count value of the on-counter CEon is decremented by 1 at a step S118, and the mode status SEcal is set to a value of 0 at a step S119. The value of 0 means that the EGR valve is in the transient state where it has been changed from the off state to the on state.

Figure 9:
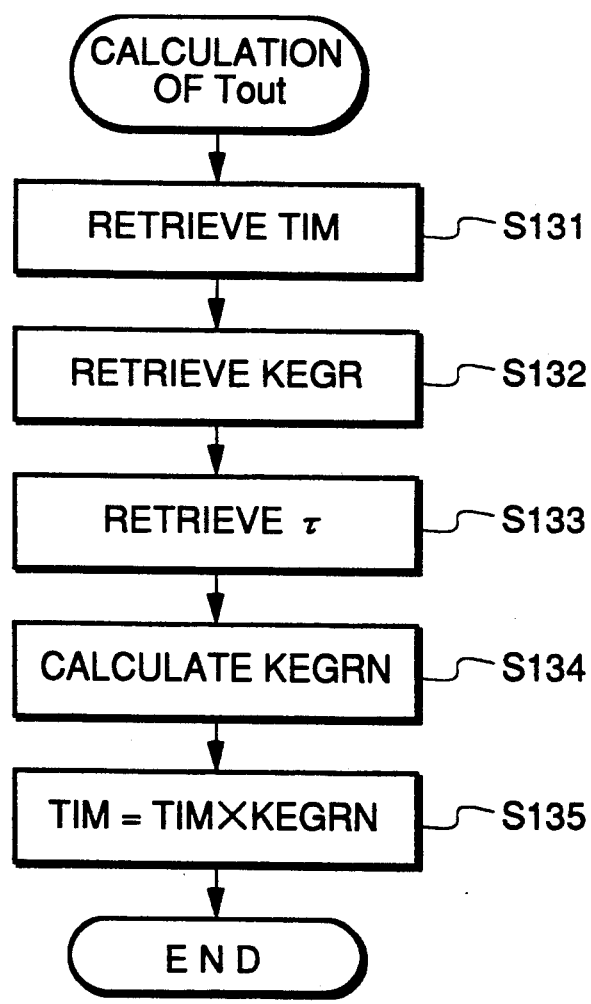
FIG. 9 is a flowchart of a program for calculating the basic fuel amount TIM, which is executed by the program of FIG. 8.
Figure 10:
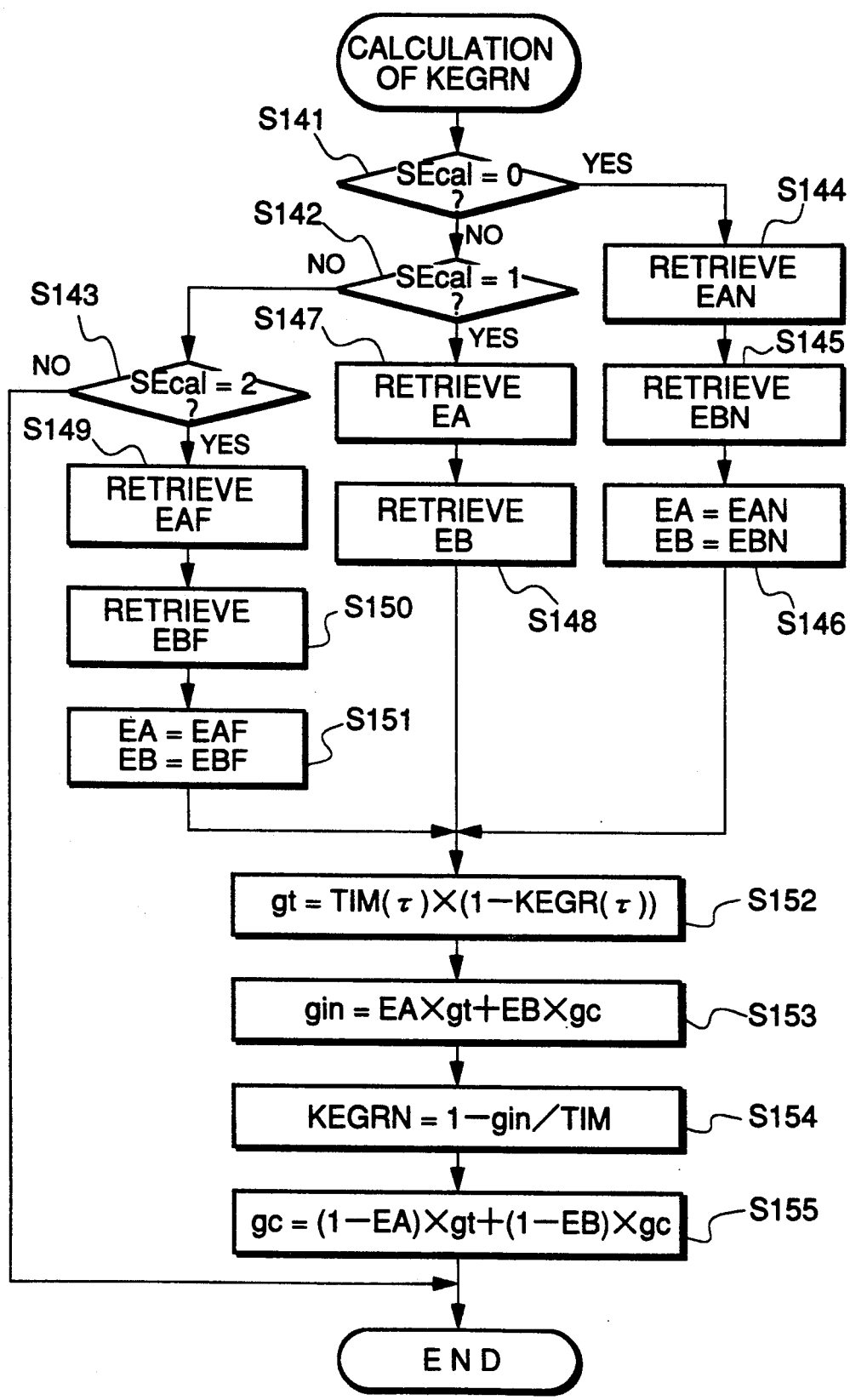
FIG. 10 is a flowchart of a program for calculating a net EGR coefficient KEGRN, which is executed by the program of FIG. 9.
Figure 11:
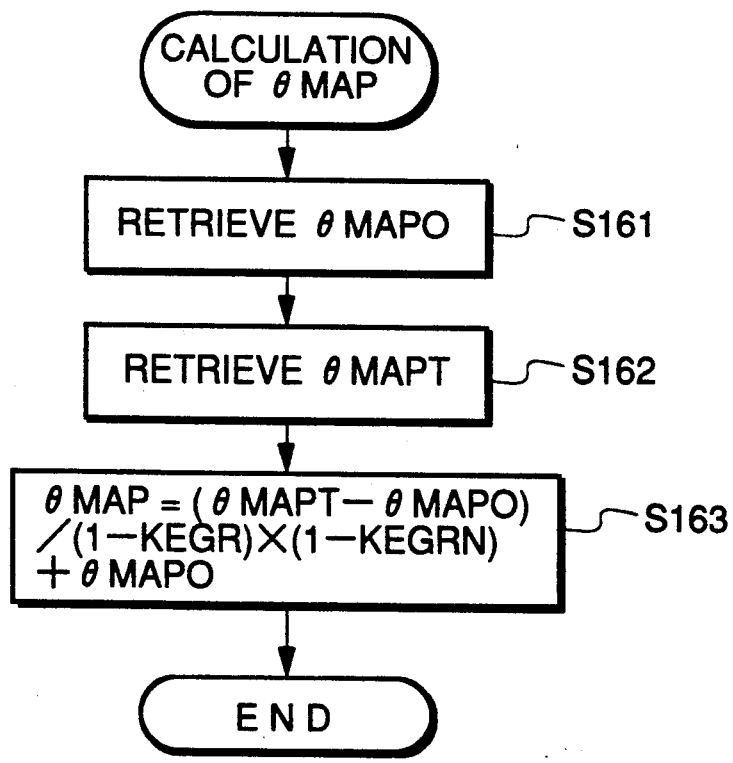
FIG. 11 is a flowchart of a program for calculating the basic ignition timing $\theta$MAP, which is executed by the program of FIG. 8.

At the following steps S120, S121, similar programs to the programs of FIG. 9 to FIG. 11 are executed as at the aforementioned steps S109 and S110, followed by terminating the program.

If the answer to the question of the step S113 is affirmative (YES), i.e., if CEon=0, which means that the predetermined number (Non) of TDC signal pulses have been generated after the transition to the EGR on state, then, it is determined that the on state has become stable, and therefore the mode status SEcal is set to a value of 1 at a step S115. The value of 1 means that the EGR valve is in the on state.

At the following steps S116, S117, similar programs to the programs of FIG. 9 to FIG. 11 are executed as at the steps S109, S110, followed by terminating the program.

FIG. 9 shows the program for calculating the basic fuel amount TIM at the above-mentioned step S109 in FIG. 8. The programs executed at the steps S116 and S120 in FIG. 8 are substantially identical with the present program, and therefore description of which is, therefore, omitted.

At steps S131 to S133, the basic fuel amount TIM, an EGR coefficient KEGR and a dead time $\tau$ are calculated based upon the engine rotational speed NE and the intake passage absolute pressure PBA. These parameters TIM, KEGR and $\tau$ are calculated by retrieving maps set in accordance with the NE value and the PBA value, and an interpolation is carried out, if required. Each of these maps is comprised of two kinds of maps, one for the high-speed V/T, and the other for the low speed V/T, which are selected depending upon the selected valve timing of the intake valves.

Figure 12:
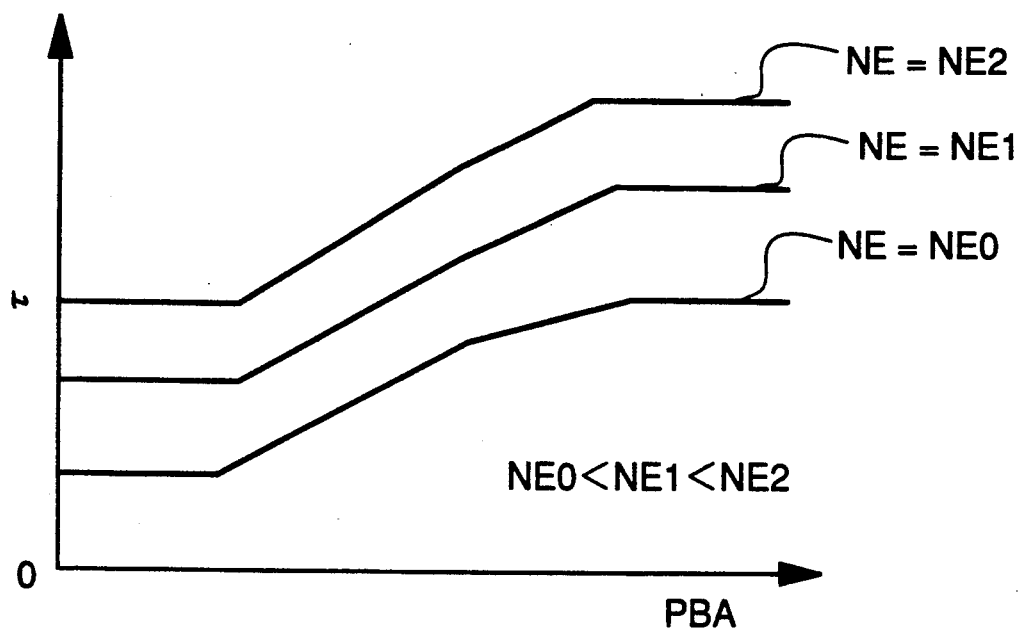
FIG. 12 shows a map for determining a deadtime $\tau$ in exhaust gas recirculation.

The EGR coefficient KEGR is provided to correct the TIM value in the decreasing direction, in view of the fact that an inactive gas is recirculated into the intake pipe 2 during EGR on, so that the intake air amount substantially decreases. (1−KEGR), hereinafter referred to, corresponds to the recirculation ratio EGRR/R. The dead time $\tau$ corresponds to a time period between the time the recirculation gas passes the EGR valve 22 and the time the gas reaches the combustion chamber. In the present embodiment, the dead time $\tau$ is expressed or counted in terms of the number of TDC pulses generated. The dead time $\tau$ is set to greater values as the PBT value or the NE value is longer or higher, for instance, as shown in FIG. 12.

At the following steps S134, S135, a net EGR coefficient KEGRN is calculated by the program of FIG. 10, and the TIM value is corrected by the calculated KEGRN value by the use of the following equation (9) at the step S135, followed by terminating the program:

$$TIM = TIM \times KEGRN \qquad (9)$$

At steps S141 to S143 in FIG. 10, it is determined which value of 0, 1 or 2 the mode status SEcal assumes.

If the answer is negative (NO) at all of the steps S141 to S143, i.e., if the SEcal value does not assume any value of 0, 1, or 2, this means that the SEcal=3, indicating that the EGR valve is in the off state. Therefore, the amount of EGR recirculation gas need not be calculated, and accordingly, the program is immediately terminated.

If the answer to the question of the step S141 is affirmative (YES), i.e., if SEcal=0, this means that the EGR valve has just been shifted to the on state from the off state, and therefore an EGR direct supply ratio EAN and an EGR carry-off ratio EBN to be applied at the transition from EGR off to EGR on are calculated at steps S144-S146. If the answer to the question of the step S142 is affirmative (YES), i.e., if SEcal=1, meaning that the EGR valve is open, an EGR direct supply ratio EA and an EGR carry-off ratio EB to be applied at EGR on are calculated at steps S147, S148. If the answer to the question of the step S143 is affirmative (YES), i.e., if SEcal=2, meaning that the EGR valve has just been changed to the on state from the off state, an EGR direct supply ratio EAF and an EGR carry-off ratio EBF to be applied at the transition from EGR on to EGR off are calculated at steps S149 to S151, and then the program proceeds to a step S152.

Figure 13A:
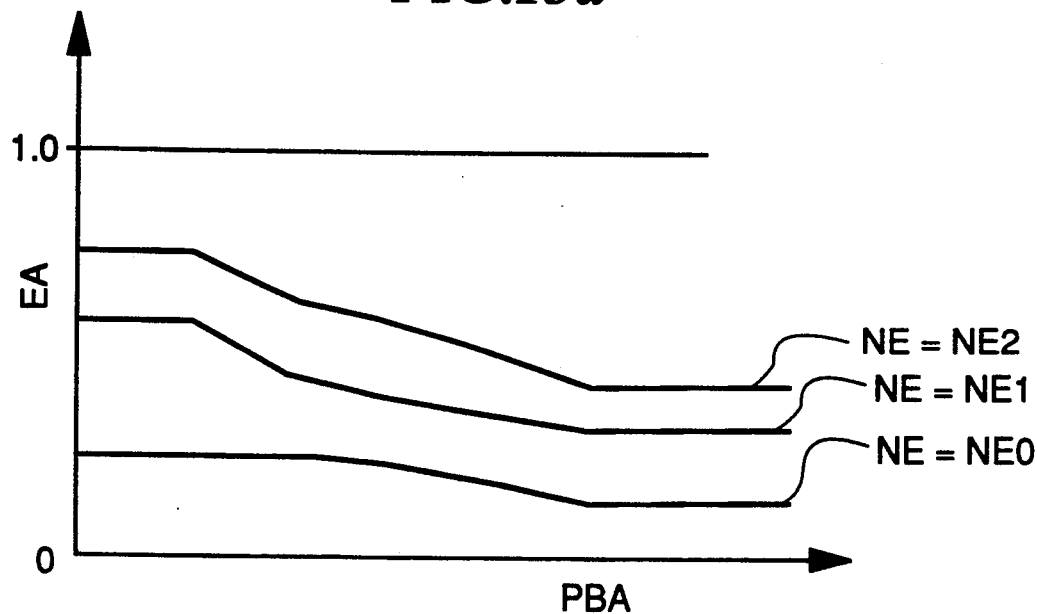
FIGS. 13a and 13b show tables for determining an EGR direct supply ratio EA and an EGR carry-off ratio EB.
Figure 13B:
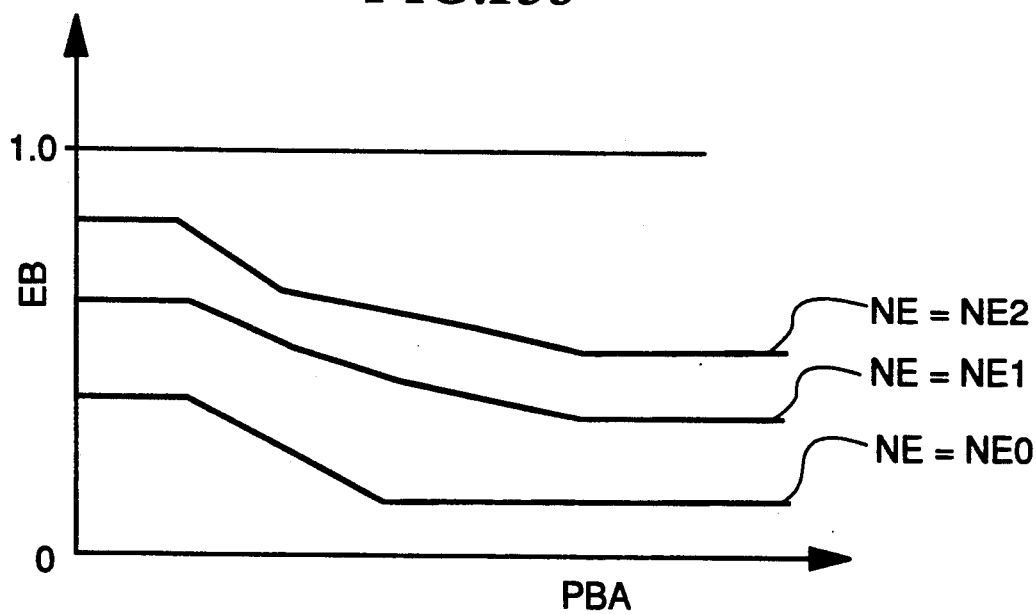

The EGR direct supply ratio EA is defined as a ratio of an amount of recirculation gas directly or immediately drawn into the combustion chamber in a cycle to the whole amount of the gas which has passed the EGR valve 22 in the same cycle, and the EGR carryoff ratio EB is defined as a ratio of an amount of recirculation gas staying in a portion of the recirculation passage 21, hereinafter referred to, in the last or immediately preceding cycle and drawn into the combustion chamber in the present cycle to the whole amount of recirculation gas which stayed in the portion of the recirculation passage 21 including the intake pipe 2 from the EGR valve 22 to the combustion chamber (mainly in the bulk chamber 21c) in the last cycle or immediate preceding cycle. The EGR direct supply ratio EA and the EGR carry-off ratio EB are read, respectively, from an EA map and an EB map as shown in FIGS. 13a and 13b, which are set in accordance with the engine rotational speed NE and the intake pipe absolute pressure PBA, in response to a value of engine rotational speed NE($\tau$) and a value of intake pipe absolute pressure PBA($\tau$) which were detected in a loop preceding the present loop by a number of TDC signal pulses corresponding to the dead time $\tau$ (hereinafter referred to as "$\tau$TDC"), at steps S147, S148. That is, "$\tau$" represents the dead time calculated at the step S133 in FIG. 9. The EA map and the EB map are each comprised of two maps, one for the high-speed V/T, and the other for the low-speed V/T, which are selected depending upon the selected valve timing of the intake valves. The value of $\tau$TDC is read in response to the value of $\tau$ from detected values corresponding, respectively, to, for instance, past 20 TDC pulses stored in the memory means 5C.

The EGR direct supply ratios EAN and EAF at the EGR off to on transition and at the EGR on to off transition are read, respectively, from an EAN map and an EAF map (whose formats are similar to those shown in FIG. 13a, 13b) set in accordance with dynamic characteristics of the recirculation gas in respective transient states, in response to the NE($\tau$) and PBA($\tau$) values at steps S144, S149. The EGR carry-off ratios EBN, EBF at the EGR off to on transition and at the EGR on to off transition are similarly calculated at steps S145, S150. The map values of the EAN map, the EAF map, the EBN map and the EBF map are set to values which compensate for the response time lag of the EGR valve 22 (a time period between the time the ECU 5 outputs a control signal and the time the EGR valve is opened to a valve opening corresponding to the command value).

Then, at a step S152, a required recirculation gas amount (an apparent amount of recirculation gas which passed the EGR valve 22) gt is calculated by the following equation (10):

$$gt = TIM(\tau) \times (1 - KEGR(\tau)) \qquad (10)$$

where ($\tau$) indicates that the value concerned is a value calculated $\tau$TDC before.

At the next step S153, an actual recirculation gas amount gin, which is to be actually drawn into the combustion chamber, is calculated by the use of the following equation (11):

$$gin = EA \times gt + EB \times gc \qquad (11)$$

where gc represents an amount of recirculation gas staying in the bulk chamber 21C, etc. after passing the EGR valve and calculated at a step S155, referred to hereinafter, in the execution of the present program in the last loop.

At the following step S154, the net EGR coefficient KEGRN is calculated by the use of the following equation (12):

$$KEGRN = 1 - gin/TIM \qquad (12)$$

At the step S155, the staying gas amount gc is calculated by the use of the following equation (13), followed by terminating the program:

$$gc = (1 - EA) \times gt + (1 - EB) \times gc \qquad (13)$$

where gc on the right side is a value calculated in the last loop.

According to the program of FIG. 10 described above, the EGR direct supply ratio EA and the EGR carry-off ratio are set to values which reflect the dead time in the travel of the recirculation gas (the time period between the time the recirculation gas passes the EGR valve and the time the gas reaches the combustion chamber) and the response time lag in the opening/closing action of the EGR valve, so that the actual gas amount gin drawn into the combustion chamber, obtained by applying the EA and EB values to the equation (11) accurately represents the recirculation gas amount drawn into the combustion chamber, which reflects dynamic characteristics of the recirculation gas, i.e., the influence of the dead time and the gas amount staying in the bulk chamber, etc., and dynamic characteristics of the EGR valve. Thus, the accurate basic fuel amount TIM reflecting the influence of the EGR gas recirculation can be obtained by multiplying the basic fuel amount TIM by the net EGR coefficient KEGRN by the use of the equation (12) (step S135 in FIG. 9). Therefore, the air-fuel ratio of the mixture to be supplied to the combustion chamber can be accurately controlled to a desired value. Further, according to the present embodiment, the TIM map, and the EA map and the EB map are each comprised of two kinds of maps for the high-speed V/T and for the low-speed V/T, which are selected depending upon the selected valve timing of the intake valves. As a result, a further accurate value of the basic fuel injection amount TIM can be obtained, which reflects the influence of operating characteristics of the intake valves, in addition to the influence of the recirculation gas. The reason for providing two kinds of maps for the high-speed V/T and the low-speed V/T for each of the TIM map, and the EA and EB maps is that variations in the flow velocity of intake fluid through the intake valves and the resulting variations in the pressure within the intake pipe, which form part of factors determining recirculation gas-transport parameters, are also affected by the opening/closing timing and lift of the intake valves. Therefore, the EGR direct supply ratio EA and the EGR carry-off ratio EB both show different values between when the highspeed V/T is selected and when the low-speed V/T is selected. Accordingly, the EA map and the EB map are set with the above-mentioned influence of the valve timing taken into account.

FIG. 11 shows the program for calculating the basic ignition timing $\theta MAP$.

At a step S161, the basic ignition timing $\theta MAP0$ for EGR off is read from a $\theta MAP$ map for EGR off, which is set in accordance with the engine rotational speed NE and the intake pipe absolute pressure PBA, in response to the sensed NE and PBA values, and at a step S162 the basic ignition timing $\theta MAPT$ for EGR on is read from a $\theta MAP$ map for EGR on, which is set like the $\theta MAP$ map for EGR off, in response to the sensed NE and PBA values. Also the $\theta MAP$ map for EGR on and the $\theta MAP$ map for EGR off are each comprised of two maps, one for the high-speed V/T and the other for the low-speed V/T, to be selected depending upon the valve timing of the intake valves selected.

At the next step S163, the basic ignition timing $\theta MAP$ is calculated by the use of the following equation (14):

$$\theta MAP = (\theta MAPT - \theta MAPO) \times (1 - KEGRN) / (1 - KEGR) + \theta MAPO \quad (14)$$

According to the equation (14), at EGR off, KEGRN=1 holds (because gin=0 holds in the aforementioned equation (12)), and hence $\theta MAP = \theta MAPO$, whereas at EGR on, when KEGR=KEGRN holds, $\theta MAP = \theta MAPT$, and when KEGR≠KEGRN holds, $\theta MAP$ is obtained by linearly interpolating the $\theta MAPT$ value and the $\theta MAPO$ value. In this way, at EGR on, the basic ignition timing $\theta MAP$ is determined by the use of the net EGR coefficient KEGRN calculated to a value reflecting dynamic characteristics of the EGR valve and those of the recirculation gas, and therefore the ignition timing can be accurately controlled to a desired value.

In the present embodiment, the valve opening command value LCMD for the EGR valve 22 is set to a value based upon the EGR coefficient KEGR.

Figure 14A:
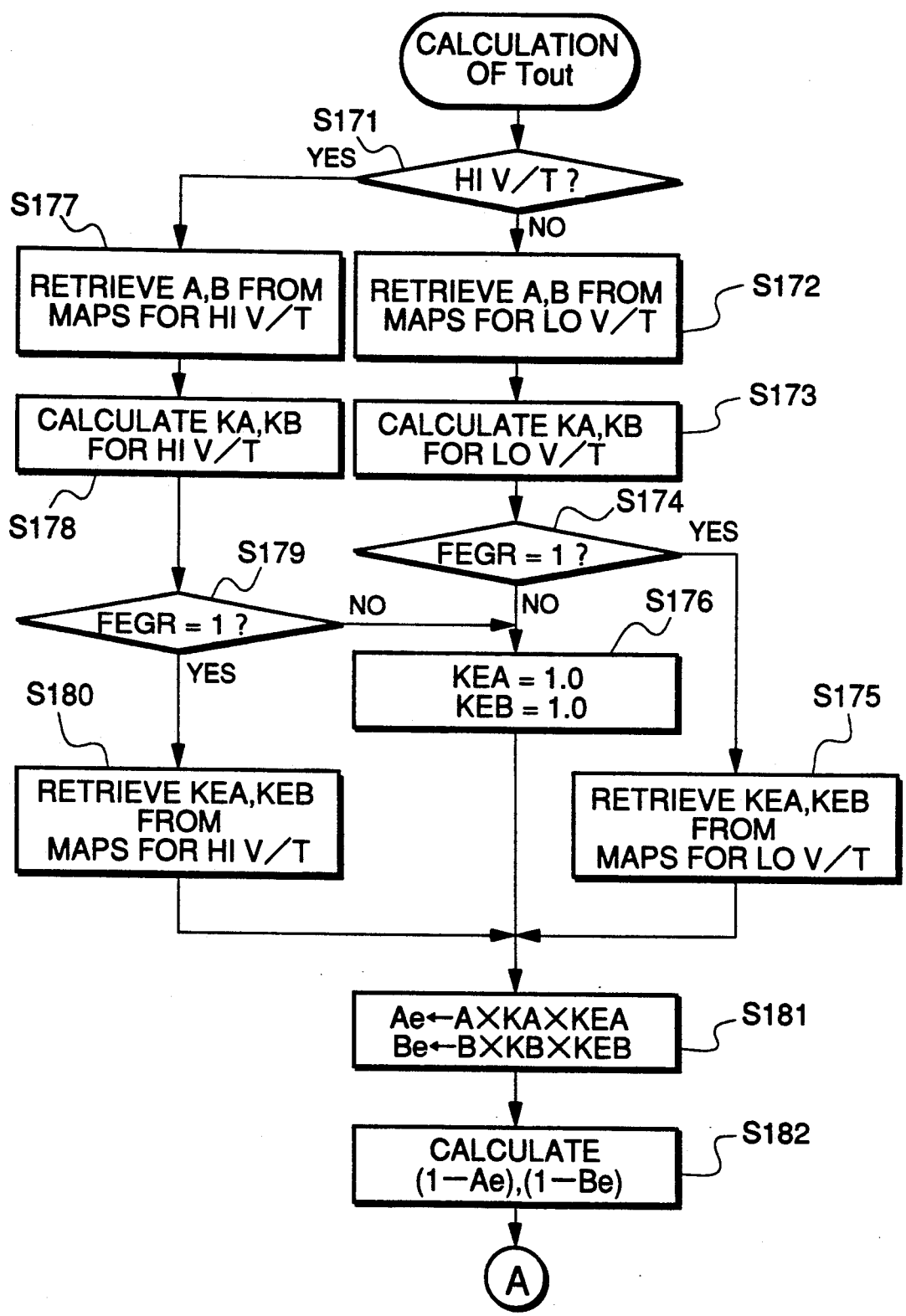
FIGS. 14a and 14b are flowcharts of a program for calculating the fuel injection period Tout, according to the third embodiment.
Figure 14B:
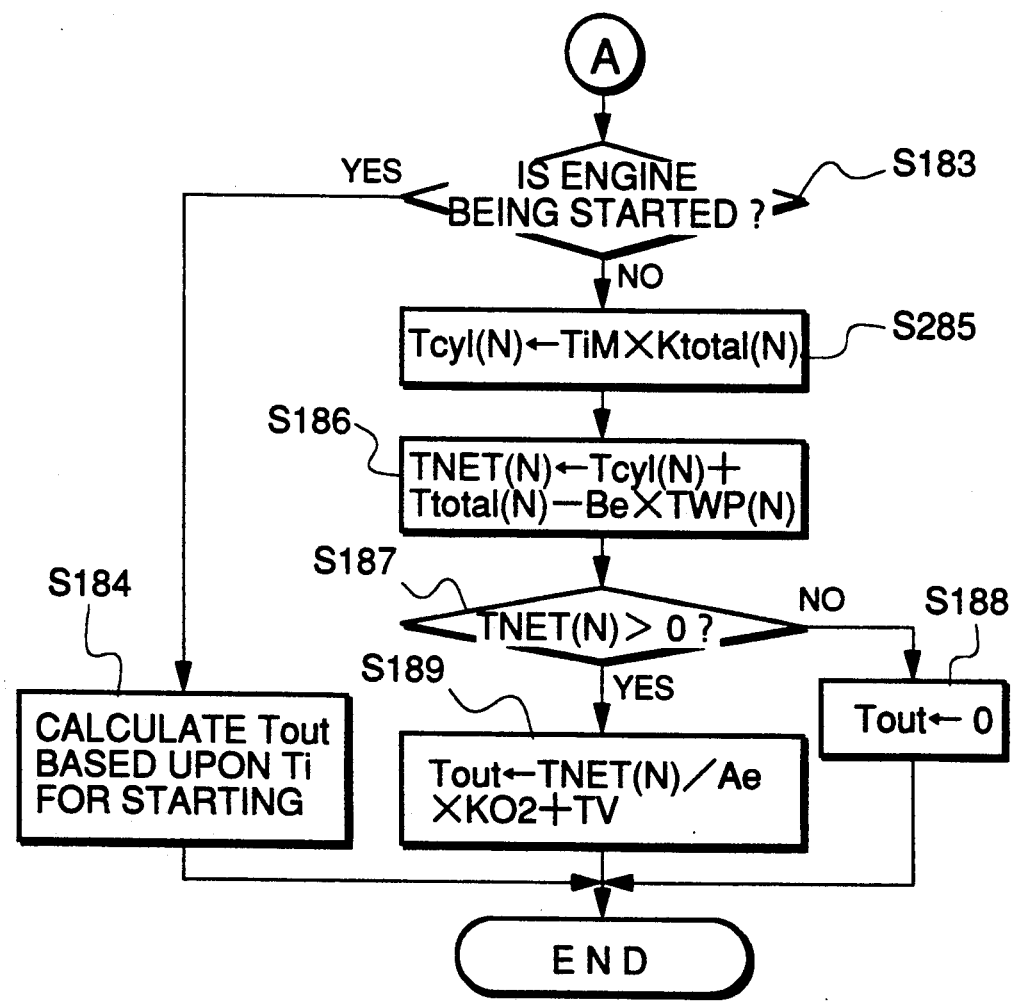

FIGS. 14a and 14b show a program for calculating the fuel injection amount (fuel injection period) Tout, according to the third embodiment. This program is executed upon generation of each TDC signal pulse and in synchronism therewith.

At a step S171, it is determined whether or not the high-speed V/T has been selected. If the answer to the question is negative (NO), i.e., if the low-speed V/T has been selected, the direct supply ratio A and carry-off ratio B for the low-speed V/T are calculated in a manner similar to that described previously, at a step S172.

Figure 15A:
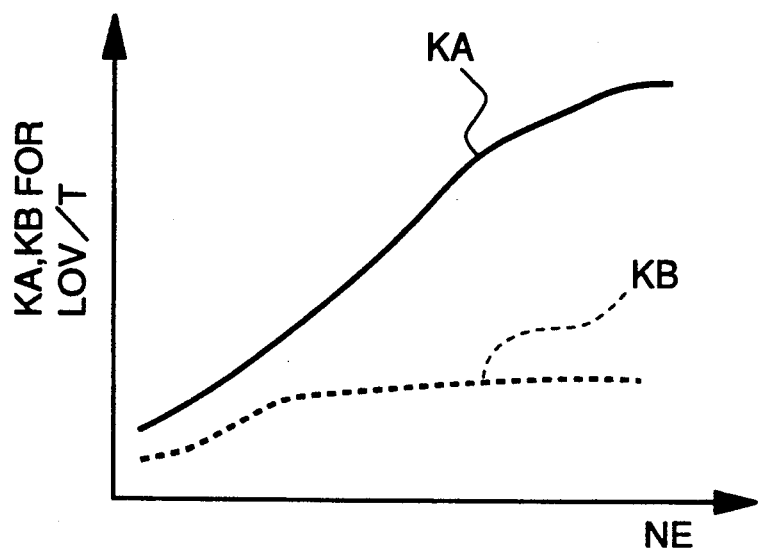
FIGS. 15a and 15b show tables for determining correction coefficients KA, KB, KEA, KEB for the direct supply ratio and the carry-off ratio.

At the next step S173, first correction coefficients KA and KB for correcting the direct supply ratio A and carry-off ratio B for the low-speed V/T, respectively, are calculated by the use of a KA table and a KB table for the low-speed V/T as shown in FIG. 15a, in which the first correction coefficients KA and KB are set in accordance with the engine rotational speed NE. The first correction coefficients KA and KB are set to larger values as the engine rotational speed NE increases, similarly to the tables in FIG. 4, for the same reason as mentioned hereinbefore.

Next, at a step S174, it is determined whether or not the EGR flag FEGR assumes the value of 1. If the answer is affirmative (YES), i.e., if the EGR valve is open, second correction coefficients KEA and KEB for correcting the direct supply ratio A and the carry-off ratio B are calculated in response to the net EGR coefficient KEGRN calculated at the step S154 in FIG. 10, at a step S175, and then the program proceeds to a step S181. The second correction coefficients KEA and KEB are set in accordance with the (1−KEGRN) value, for instance, as shown in FIG. 16.

In the figure, the abscissa indicates the (1−KEGRN) value, which is equal to gin/TIM according to the aforementioned equation (12) and corresponds to the net recirculation ratio EGRR/RN (calculated to a value reflecting dynamic characteristics of the EGR valve 22 and those of the recirculation gas).

Figure 16:
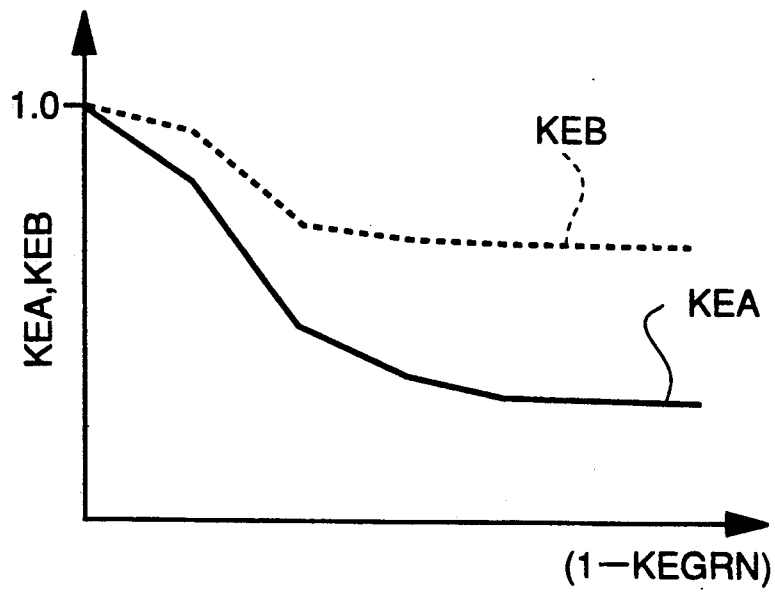
FIG. 16 shows tables for determining second correction coefficients KEA and KEB for correcting the direct supply ratio and the carry-off ratio.

The reason why, as shown in FIG. 16, the KEA and KEB values are set to smaller values as the net recirculation ratio EGRR/RN becomes larger is that the heat flux (amount of thermal transfer per unit area) within the intake pipe becomes lower as the recirculation gas amount increases, making it more difficult for fuel within the intake pipe to be vaporized.

Also the KEA map and the KEB map are each comprised of two maps, one for the high-speed V/T and the other for the low-speed V/T, to be selected depending upon the selected valve timing of the intake valves. At the step S175 the KEA and KEB maps for the low-speed V/T are selected.

If the answer to the question of the step S174 is negative (NO), i.e., if FEGR=0, which means that the EGR valve is closed, the second correction coefficients KEA, KEB are both set to a value of 1.0, at a step S176, and then the program proceeds to the step S181.

Figure 15B:
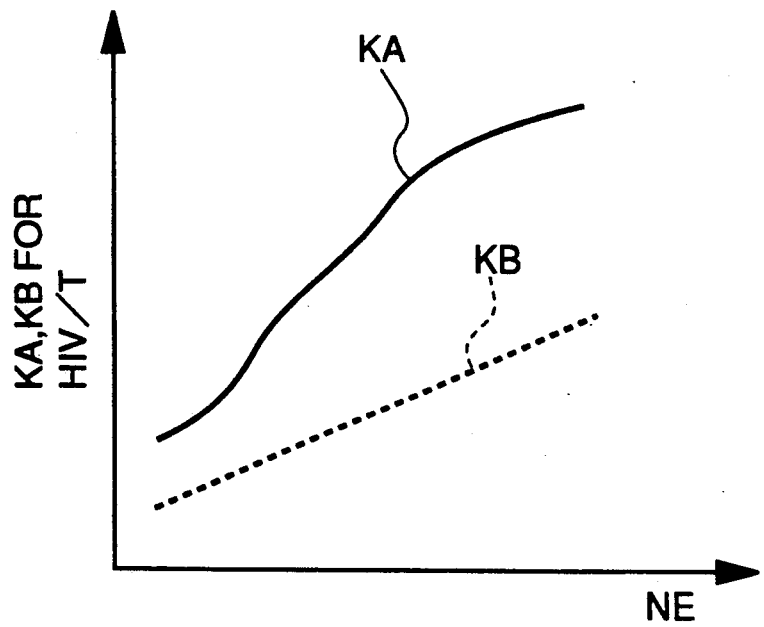

If the answer to the step S171 is affirmative (YES), the correction coefficients KA, KB for the high-speed V/T are calculated in a manner similar to the steps S172, S173 described above, at steps S177 and S178, and then the program proceeds to a step S179. At the step S177, values of the direct supply ratio A and the carryoff ratio B are read from the A and B maps for the high-speed V/T, and then at the step S178 the correction coefficients KA, KB for the high-speed V/T are calculated by the use of KA and KB tables for the high-speed V/T as shown in FIG. 15b.

The reason for providing two kinds of maps for the high-speed V/T and the low-speed V/T not only for the A and B maps but also for the KA and KB tables is that variations in the flow velocity of intake fluid through the intake valves and the resulting variations in the pressure within the intake pipe, which form part of factors determining fuel-transport parameters, are also affected by the opening/closing timing and lift of the intake valves. Therefore, the direct supply ratio A and the carry-off ratio B both show different values between when the high-speed V/T is selected and when the low-speed V/T is selected. Accordingly, the A map and the B map, and the KA map and the KB map are set with the above-mentioned influence of the valve timing taken into account.

At the step S179, it is determined whether or not the EGR flag FEGR assumes the value of 1. If the answer to the question is affirmative (YES), that is, if the EGR valve is open, the second correction coefficients KEA, KEB for the direct supply ratio A and the carry-off ratio B are calculated at a step S180, in response to the net EGR coefficient KEGRN calculated at the step S154 in FIG. 10, similarly to the step S175, followed by the program proceeding to the step S181. The second correction coefficients KEA, KEB are set in accordance with the value (1−KEGRN), similarly to FIG. 16. At the step S180, the KEA, KEB maps for the high-speed V/T are selected.

If the answer to the question of the step S179 is negative (NO), i.e., if FEGR=0, which means that the EGR valve 22 is closed, the second correction coefficients KEA, KEB are both set to 1.0 at a step S176, and then the program proceeds to the step S181.

At the step S181, corrected values Ae and Be of the direct supply ratio A and the carry-off ratio B are calculated by the use of the following equations (15) and (16). Further, values (1−Ae) and (1−Be) are calculated at a step S182, followed by the program proceeding to a step S183:

$$Ae = A \times KA \times KEA \quad (15)$$

$$Be = B \times KB \times KEB \quad (16)$$

The values Ae, (1−Ae) and (1−Be) thus calculated are stored into the RAM of the ECU 5 for use in executing the program shown in FIG. 3, described hereinbefore.

The fuel injection amount Tout is calculated based upon the thus calculated Ae and Be values, at steps S183 to S189 in FIG. 14b. The steps S183 to S189 in FIG. 14b are identical with the steps S5 to S7, and S10 to S13 in FIG. 2, described hereinbefore, description of which is, therefore, omitted. In addition, the basic fuel amount TIM in the step S185 in FIG. 14b is applied at ordinary operation of the engine (other than at the start of the engine), and calculated based upon the engine rotational speed NE and the intake pipe absolute pressure PBA, as mentioned before, as well as in response to the exhaust gas recirculation amount and the valve timing of the intake valves in a manner reflecting dynamic characteristics of the EGR valve and those of the recirculation gas (the steps S109, S116, and S120 in FIG. 8 and the step S135 in Dig. 9).

Further, the intake pipe-adherent fuel amount TWP in the step S186 is calculated by the program of FIG. 3, like the first embodiment.

According to the present embodiment, as described above, the second correction coefficients KEA, KEB are calculated in response to the net recirculation rate EGRR/RN (=1−KEGRN) which is calculated by taking into account dynamic characteristics of the EGR valve and those of the recirculation gas, and then the direct supply ratio A and the carry-off ratio B are corrected by the calculated second correction coefficients KEA, KEB. As a result, an accurate correction of the direct supply ratio and the carry-off ratio can be achieved in a manner reflecting the response time lag of the EGR valve and the influence of the recirculation gas staying between the EGR valve and the combustion chamber, thereby making it possible to calculate an accurate fuel supply amount which compensates for the influence of the recirculation gas and hence to accurately control the air-fuel ratio of a mixture supplied to the combustion chambers of the cylinders to a desired value.

Besides, according to the present embodiment, the maps used for the correction is set in dependence on the selected valve timing of the intake valves, and the direct supply ratio A and the carry-off ratio B are corrected by the use of these maps. Therefore, it is possible to estimate the amount of fuel adhering to the inner surface of the intake pipe irrespective of the valve timing selected, to thereby further accurately control the air-fuel ratio to a desired value.

The second correction coefficients KEA, KEB may be calculated based upon the recirculation rate EGRR/R (=1−KEGR: KEGR is the EGR coefficient calculated at the step S132 in FIG. 9), or the valve opening (lift) command value LCMD of the EGR valve 22 or the actual valve opening (lift) LACT sensed by the lift sensor 23, in place of the net recirculation rate EGRR/RN. Moreover, the second correction coefficients KEA, KEB may be calculated based upon a flow rate of exhaust gases flowing in the exhaust gas recirculation passage 27, which is sensed by a flowmeter provided in the passage 27. In short, the correction coefficients may be calculated by any detected parameter or any estimated parameter representative of the recirculation gas amount. Even by these alternative methods, the calculated fuel injection amount can reflect the influence of the recirculation gas amount, enabling accurate air-fuel ratio control compensating for the influence of the recirculation gas. However, in the above described embodiment, the calculation of the correction coefficients KEA, KEB can also reflect dynamic characteristics of the EGR valve and those of the recirculation gas, which can ensure accurate air-fuel ratio control even when the EGR valve is in a transient state where it has shifted from an open position to a closed position or vice versa.

The present invention is not limited to the above described embodiments, but various modifications thereof can be made within the scope of the appended claims. For example, although in the above described third embodiment, the fuel correction is made based upon the valve timing of intake valves, it may be made based upon the valve timing of exhaust valves as well as the valve timing of intake valves.

What is claimed is:

1. In a control system for an internal combustion engine having at least one combustion chamber, and an intake passage having an inner surface, comprising operating condition detecting means for detecting operating conditions of said engine, supply fuel amount determining means responsive to operating conditions of said engine detected by said operating condition detecting means, for determining an amount of fuel to be supplied to said engine, adherent fuel amount estimating means for estimating an amount of fuel adhering to said inner surface of said intake passage, carried-off fuel amount estimating means for estimating an amount of fuel carried off fuel adhering to said inner surface of said intake passage and carried into said combustion chamber, supply fuel amount correction means for correcting said supply fuel amount determined by said supply fuel amount determining means, based upon operating conditions of said engine detected by said operating condition detecting means, and said adherent fuel amount estimated by said adherent fuel amount estimating means and said carried-off fuel amount estimated by said carried-off fuel amount estimating means, and fuel supply means for supplying said supply fuel amount corrected by said supply fuel amount correcting means into said intake passage;

the improvement comprising correction limiting means for limiting said correction of said supply fuel amount based upon said estimated adherent amount and said estimated carried-off fuel amount by said supply fuel amount correcting means, when said operating condition detecting means detects that said engine is operating in an idling condition.

2. A control system as claimed in claim 1, wherein said adherent fuel amount estimating means and said carried-off fuel amount estimating means estimate said adherent fuel amount and said carried-off fuel amount, respectively, based upon operating parameters of said engine including pressure within said intake passage.

3. A control system as claimed in claim 1 or 2, wherein said correction limiting means inhibits said correction of said supply fuel amount based upon said estimated adherent amount and said estimated carried-off fuel amount by said supply fuel amount correcting means.

4. A control system as claimed in claim 1 or 2, wherein said adherent fuel amount estimating means continues said estimation of said adherent fuel amount even when said engine is detected to be operating in said idling condition.

5. A control system as claimed in claim 1 or 2, wherein said correction limiting means causes said adherent fuel amount estimating means and said carried-off fuel amount estimating means to estimate said adherent fuel amount and said carried-off fuel amount, respectively, based solely upon a temperature of said engine.

6. A control system as claimed in claim 5, wherein said temperature of said engine is temperature of engine coolant.

7. A control system as claimed in claim 5, wherein said correction limiting means causes said adherent fuel amount estimating means and said carried-off fuel amount estimating means to estimate said adherent fuel amount and said carried-off fuel amount, respectively, by the use of coefficients based solely upon a temperature of said engine.

8. In a control system for an internal combustion engine having an intake passage having an inner surface, at least one intake valve, at least one exhaust valve, an exhaust passage, at least one combustion chamber, exhaust gas recirculation means having an exhaust gas recirculation passage connecting between said exhaust passage and said intake passage, and an exhaust gas recirculation control valve for controlling recirculation of exhaust gases from said exhaust passage to said intake passage through said exhaust gas recirculation passage, and valve operating means for operating said intake valve and said exhaust valve, said valve operating means being capable of changing an operating mode of at least one of said intake valve and said exhaust valve, said control system including operating condition detecting means for detecting operating conditions of the engine, supply fuel amount calculating means for calculating an amount of supply fuel to be supplied to said engine, based upon operating conditions of said engine detected by the operating condition detecting means, adherent fuel amount estimating means for estimating an amount of adherent fuel adhering to said inner surface of said intake passage, carried-off fuel amount estimating means for estimating an amount of fuel carried off fuel adhering to said inner surface of said intake passage and carried into said combustion chamber, supply fuel amount correction means for correcting said supply fuel amount calculated by said supply fuel amount calculating means, based upon said adherent fuel amount estimated by said adherent fuel amount estimating means and said carried-off fuel amount estimated by said carried-off fuel amount estimating means, fuel supply means for supplying said supply fuel amount corrected by said supply fuel amount correcting means into said intake passage, and recirculation gas amount control means for controlling an amount of said exhaust gases to be recirculated from said exhaust passage to said intake passage, by controlling said exhaust gas recirculation control valve, based upon operating conditions of said engine detected by the operating condition detecting means, the improvement comprising:

recirculation gas amount calculating means for calculating said amount of said exhaust gases to be recirculated;

valve operating mode detecting means for detecting said operating mode of said at least one of said intake valve and said exhaust valve changed by said valve operating means; and estimated fuel amount correcting means for correcting said adherent fuel amount and said carried-off fuel amount, based upon said amount of said exhaust gases calculated by said recirculation gas amount calculating means and said operating mode of said at least one of said intake valve and said exhaust valve detected by said valve operating mode detecting means.

9. A control system as claimed in claim 8, wherein said recirculation gas amount calculating means calculates said amount of said exhaust gases to be recirculated, based upon dynamic characteristics of said exhaust gas recirculation control valve and those of exhaust gases being recirculated, and rotational speed and load condition of said engine.

10. A control system as claimed in claim 8 or 9, wherein said operating mode of said at least one of said intake valve and said exhaust valve is at least one of opening/closing timing and lift of said at least one of said intake valve and said exhaust valve.

11. A control system as claimed in claim 9, wherein said dynamic characteristics of said exhaust gas recirculation control valve include a response time lag of said valve in opening/closing action thereof.

12. A control system as claimed in claim 9, wherein said dynamic characteristics of said exhaust gases being recirculated include a time period between the time said exhaust gases being recirculated pass said exhaust gas recirculation control valve and the time the gases reach said combustion chamber, and an amount of exhaust gases staying in a passageway including said exhaust gas recirculation passage and said intake passage at a zone between said exhaust gas recirculation control valve and said combustion chamber.

13. A control system as claimed in claim 9, wherein said recirculation gas amount calculating means calculates said amount of said exhaust gases, based upon a ratio of an amount of exhaust gases drawn into said combustion chamber in a cycle to the whole amount of exhaust gases which has passed said exhaust recirculation gas control valve in the same cycle, and a ratio of an amount of exhaust gases staying in a portion of said exhaust gas recirculation passage and said intake passage at a zone between said exhaust gas recirculation control valve and said combustion chamber in a preceding cycle and drawn into said combustion chamber in a present cycle to the whole amount of exhaust gases which stayed in said portion of said exhaust gas recirculation passage and said exhaust gas recirculation passage and said intake passage in said preceding cycle.

* * * * *